(12) United States Patent
Durzy et al.

(10) Patent No.: US 10,936,593 B2
(45) Date of Patent: Mar. 2, 2021

(54) RESOLVING A QUERY TO A DATABASE BY TRANSMITTING IDENTIFIERS OF OBJECTS SATISFYING THE QUERY

(71) Applicant: Liberation Distribution, Inc., San Jose, CA (US)

(72) Inventors: Cheryl Murphy Durzy, San Jose, CA (US); Richard Brashears, San Jose, CA (US); David Cross, San Jose, CA (US); Jeffrey Markham, San Jose, CA (US)

(73) Assignee: Liberation Distribution, Inc., San Jose, CA (US)

( * ) Notice: Subject to any disclaimer, the term of this patent is extended or adjusted under 35 U.S.C. 154(b) by 188 days.

(21) Appl. No.: 15/936,208

(22) Filed: Mar. 26, 2018

(65) Prior Publication Data

US 2018/0276217 A1   Sep. 27, 2018

Related U.S. Application Data

(60) Provisional application No. 62/477,219, filed on Mar. 27, 2017, provisional application No. 62/585,890, (Continued)

(51) Int. Cl.
*G06F 16/2455* (2019.01)
*G06Q 30/06* (2012.01)
(Continued)

(52) U.S. Cl.
CPC ...... *G06F 16/24552* (2019.01); *G06F 16/248* (2019.01); *G06F 16/2425* (2019.01); *G06F 16/951* (2019.01); *G06Q 10/087* (2013.01); *G06Q 10/0832* (2013.01); *G06Q 20/12* (2013.01); *G06Q 20/14* (2013.01);
(Continued)

(58) Field of Classification Search
None
See application file for complete search history.

(56) References Cited

U.S. PATENT DOCUMENTS 6,085,193 A  *  7/2000  Malkin ............... H04L 29/06
6,813,690 B1 * 11/2004  Lango ............. G06F 12/0866
                                                  707/999.103

(Continued)

OTHER PUBLICATIONS

Fan et al, "Web Prefetching between Low-Bandwidth Clients and Proxies: Potential and Performance", Sigmetrics 1999, 10 pages.*

(Continued)

*Primary Examiner* — Uyen T Le

(57) ABSTRACT

In a method for resolving a query to a database, a server computing system receives a query for retrieving objects from a client device. A candidate data set of objects is determined by applying the query to the database, the candidate data set of objects including identifiers of objects satisfying the query. The candidate data set of objects is transmitted to the client computing device as the identifiers. A request for a subset of the objects corresponding to identifiers of the candidate data set of objects from the server computing system for identifiers of the candidate data set of objects that do not match the identifiers of objects stored in the cache of the client computing device is received. The subset of objects is transmitted to the client device.

20 Claims, 32 Drawing Sheets

Related U.S. Application Data filed on Nov. 14, 2017, provisional application No. 62/635,880, filed on Feb. 27, 2018.

(51) Int. Cl.

| | |
|---|---|
| *G06Q 30/00* | (2012.01) |
| *G06F 16/248* | (2019.01) |
| *G06F 16/951* | (2019.01) |
| *G06F 16/242* | (2019.01) |
| *G06Q 20/12* | (2012.01) |
| *G06Q 20/40* | (2012.01) |
| *G06Q 10/08* | (2012.01) |
| *G06Q 20/14* | (2012.01) |

(52) U.S. Cl.
CPC ........... *G06Q 20/40* (2013.01); *G06Q 30/018* (2013.01); *G06Q 30/0607* (2013.01); *G06Q 30/0625* (2013.01); *G06Q 30/0635* (2013.01); *G06Q 30/0643* (2013.01)

(56) References Cited

U.S. PATENT DOCUMENTS

| | | |
|---|---|---|
| 2007/0106617 A1 | 5/2007 | Mabray et al. |
| 2007/0244987 A1* | 10/2007 | Pedersen ................. H04L 69/10 709/217 |
| 2008/0004972 A1 | 1/2008 | Ghanma |
| 2008/0201331 A1* | 8/2008 | Eriksen ............... G06F 16/9574 |
| 2012/0215684 A1 | 8/2012 | Kidron |

OTHER PUBLICATIONS

Ronny Lempel et al, "Optimizing Result Prefetching in Web Search Engines with Segmented Indices", ACM Transactions on Internet Technology, vol. 4, No. 1, Feb. 2004, pp. 31-59.*

Cho et al, "Design of Client-Side Caching and Region Prefetching Algorithms for Internet GIS", International Symposium on Remote Sensing, 2001, 9 pages.*

* cited by examiner

600

```
RECEIVE PRODUCT INFORMATION, SALES MARKET SELECTION, AND PRICING
INFORMATION
610
```

```
STORE PRODUCT INFORMATION, SALES MARKET SELECTION, AND PRICING
INFORMATION AT A DATABASE
620
```

```
RECEIVE A SEARCH REQUEST FROM A RESELLER
705
```
```
RESPONSIVE TO RECEIVING A SEARCH REQUEST, MODIFY THE SEARCH
REQUEST ACCORDING TO A SALES MARKET AND LICENSE TYPE OF THE
RESELLER
710
```
```
SEARCH THE VIRTUAL INVENTORY FOR ALCOHOL PRODUCTS SATISFYING
THE MODIFIED SEARCH REQUEST
720
```
```
RETURN SEARCH RESULTS TO THE SEARCHING RESELLER
730
```

FIG. 7

Start by setting up your company

LibDib provides a platform for licensed makers to legally sell wine, beer and spirits to licensed Restaurants, Bars and Retailers. Fill out some basic information about your company to get started.

*is required*

* Liu-Petersen 283742834                95885844

* 1091 Michelle Stravenue Suite 729

Street Address 2 (e.g. Suite Number)

* Prattmouth    * California  ▾  * 95122

* 1-709-971-6901x273]       Optional Referral Code
Phone Number                Referral Code ( NEXT )

FIG. 9B

Next, show us your licenses

LibDib needs to know you are a licensed producer of alcohol before your products can be sold. Enter the numbers here and be done with it or if you don't have access right now, you can enter them later under your Business Profile.

Skip for Now

Federal Permit

① Entered — ② Pending — ③ Ready

TTB-123455532

RN-6563645645

SAVE

State Producer License

① Entered — ② Pending — ③ Ready

State

License Number

SAVE

*FIG. 9C*

| BRANDS | ADD BRAND | | Beer Information | | | |
|---|---|---|---|---|---|---|
| KURT HANSON BREWERY | | | Welcome to LibDib! Enter your product information here. Add descriptions, images, tasting notes and sales materials. Then go to the Pricing page. It's that easy. | | | |
| BEERS | ADD BEER | | | | | |
| | | | Beer and Package Information | | | |
| | | | Beer Information | | | |
| | | | * Double IPA ▸ | ▸ | * Kurt Hanson Brewery ▸ | |
| | | | * United States of America ▸ | | Port Sharon | |
| | | | * 10 1200| | | Dustin's IPA | |
| | | | SAVE | | | |

*FIG. 9D*

| PRODUCTS PRICING PREVIEW SELLING ORDERS RESOURCES |
|---|
| BRANDS ADD BRAND | Spirits Information |
| Wilson-Obrien | Welcome to LibDib! Enter your product information here. Add descriptions, images, tasting notes and sales materials. Then go to the Pricing page. It's that easy. |
| SPIRITS ADD SPIRITS | |

Spirits and Package Information

Spirits Information

* Whiskey ▸    Japanese ▸    * Wilson-Obrien ▸

8 Years Old ▸    * Japan ▸    Hokkaido

* 80    1200|    Case's Whiskey

SAVE

| FIG. 9K-1 |
| FIG. 9K-2 |

PRODUCTS   PRICING   PREVIEW   SELLING   ORDERS   RESOURCES

○ Orders

All of the orders for your products are kept here. For each order please enter the shipping information so that the recipients can track and be ready to receive your products. You will also be sent an email for each order that you can directly respond to in order update status.

| Orders | Kegs |

All (125)  ▼

[+] [□]

Export Orders ⇩

Ship To:
LibDib c/o Daves
6980 Santa Teresa Blvd
Suite 201
, San Jose, CA 95119
Delivery Instructions

Ordered:     01-02-18
Delivered:
Order #:     1970
   Total:    $319.00

| | QTY @ PRICE | DISCOUNT | *LIBDIB PAYS* AMOUNT |
|---|---|---|---|
| | 1 @ $141.90 | $0.00 | $141.90 |

Beer, 15.5 Gal, Single, Stainless Steel Keg, No Closure, 4.9% ABV, SKU: LD10002527, UPC:, SCC:
Keg Deposit:       1 @ $30.00       $0.00       $30.00
                   5 @ $29.42                   $147.10

Vodka, CA, 750 mL, Single, Glass Bottle, Screw Cap, 40% ABV, SKU: LD10004505, UPC:, SCC:

Placed ○

Shipments

| Shipment #1 | ▾ | Tracking Number | Ship Date | Est. Delivery Date | Delivered Date |

+ ADD ANOTHER SHIPMENT

Assign Line Items to Shipments

Beer, 15.5 Gal, Single, Stainless Steel Keg, No Closure, 4.9% ABV, SKU: LD10002527, UPC:, SCC:
1 ▾ 1
Shipment  Keg in shipment

Vodka, CA, 750 mL, Single, Glass Bottle, Screw Cap, 40% ABV, SKU: LD10004505, UPC:, SCC:
1 ▾ 5
Shipment  Bottles in shipment Keg Returns

+ ADD ANOTHER KEG RETURN

PACKING SLIPS ⇅   WAREHOUSE DOCUMENTS ⇅

SAVE

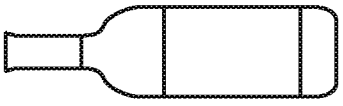

932

| SHOP | ORDERS | LISTS | RESOURCES | | Cart ✕ ▸ |
|---|---|---|---|---|---|
| Item Details | | | | | J. M Chardonnay by Jeff's Winery |

Jeff's Winery
J.M Chardonnay
Napa Valley, North Coast, California

SKU: 10001317

750 mL, Case of 12, Glass Bottle, Cork

About this item:
One of the best chardonnays in the world. You'll love it. It's fantabulous.

VINTAGE 2014
REGION Napa Valley
BLEND It's not a blend...
ALCOHOL 12.2%
PRODUCTION 1002 Cases Produced
KEYWORDS Award-Winning, Vegan, Dry Mentions
Press Release

LibDib Cracks the Code of Modern Three Tier Alcohol
The most shocking thing about the new Liberation ☐ Fermentation Other products from Jeff's Winery

Cart
J. M Chardonnay by Jeff's Winery
Quantity  Price       Subtotal
1         @$320.00  = $320.00

(CLEAR)  (UPDATE)

Total  $320.00

(REVIEW PURCHASE ORDER)

*FIG. 9P*

SHOP    ORDERS    LISTS    RESOURCES

◯ Checkout

Complete Your Purchase

Checkout: 1 Items

Order Line Items                              Qty@ Price    Discount    Price

Jeff's Winery, J.M Chardonnay, Napa Valley, 750 mL, Case of    1@ $320.00    $0.00    $320.00
12, Glass Bottle, Cork, 12.2% ABV, SKU: LD10001317, UPC: 234234, SCC: 234234

Delivery Instructions

Special delivery instructions, if any

Purchase Order Number

Optional P.O. #  _____

Choose Payment Method
  ◯ Credit Card    ● E-Invoice On Delivery

You will receive an invoice upon delivery.
E-Invoice will be sent to: jeff@_____.com You will have 5 minutes to cancel your order on the orders page prior to it being automatically confirmed.

( PURCHASE )

FIG. 9Q

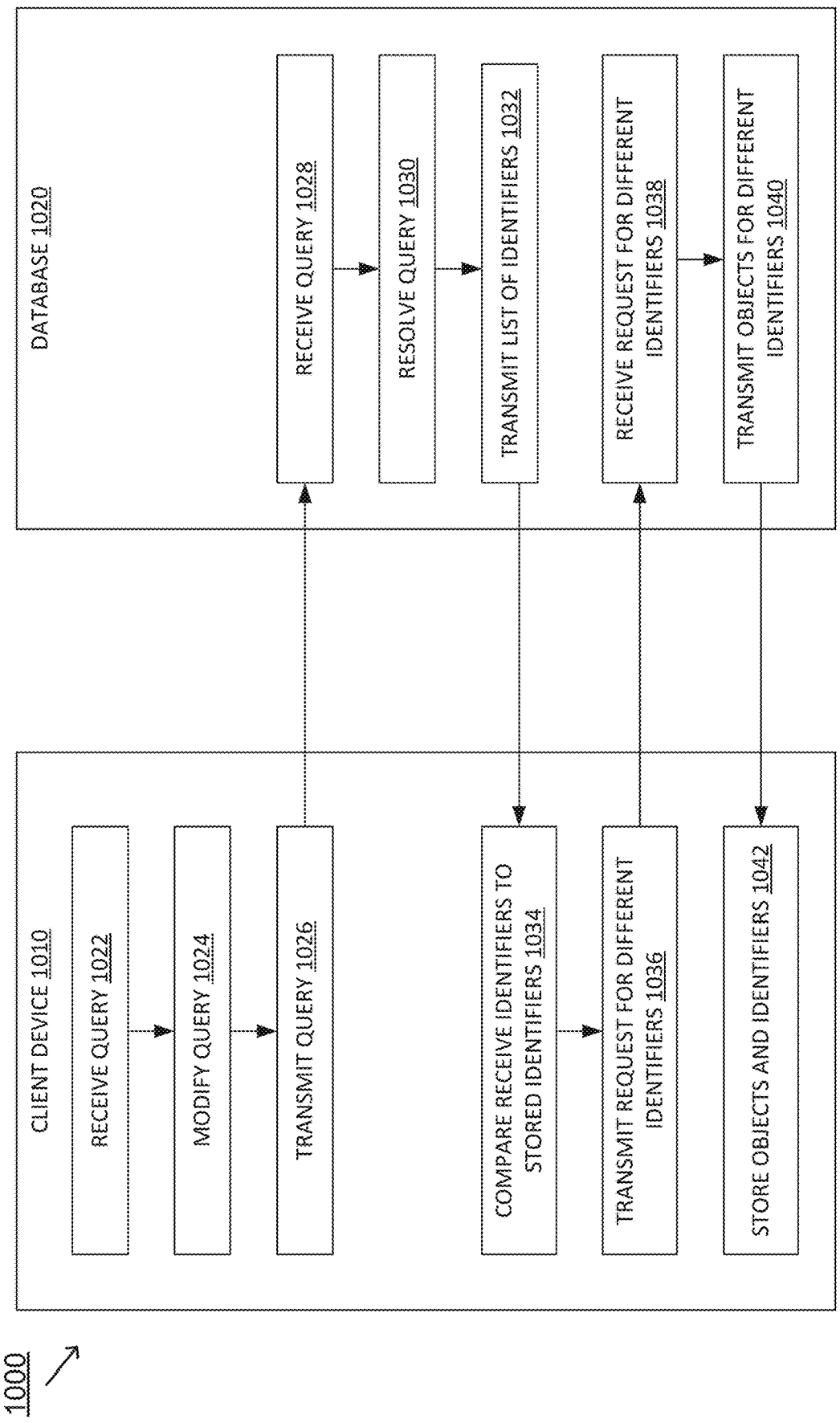

RESOLVING A QUERY TO A DATABASE BY TRANSMITTING IDENTIFIERS OF OBJECTS SATISFYING THE QUERY

RELATED APPLICATIONS

This application claims priority to the provisional patent application having Application No. 62/477,219, entitled "A METHOD FOR DISTRIBUTING A PRODUCT," with filing date Mar. 27, 2017, by Cheryl Murphy Durzy, and assigned to the assignee of the present application, the disclosure of which is hereby incorporated herein by reference in its entirety.

This application also claims priority to the provisional patent application having Application No. 62/585,890, entitled "A METHOD FOR DISTRIBUTING A PRODUCT WITHIN A THREE-TIER SYSTEM," with filing date Nov. 14, 2017, by Cheryl Murphy Durzy, and assigned to the assignee of the present application, the disclosure of which is hereby incorporated herein by reference in its entirety.

This application also claims priority to the provisional patent application having Application No. 62/635,880, entitled "SYSTEM AND METHOD FOR DISTRIBUTION OF A REGULATED PRODUCT," with filing date Feb. 27, 2018, by Cheryl Murphy Durzy, et al., and assigned to the assignee of the present application, the disclosure of which is hereby incorporated herein by reference in its entirety.

BACKGROUND

Database systems are typically used to manage large volumes of data in a searchable manner. In many types of database systems, users submit search requests (e.g., search queries) that are resolved by the database and presented as search results. The user experience is in many ways dependent on the responsiveness of the database system in how quickly the search results can be returned to the user. For example, in an e-commerce website, a response time of over 5-10 seconds may be unacceptably long for a user, resulting in that user using another e-commerce website. In order to present a large or potentially large list of data to a user or automaton, the process of querying the database, curating the content, and then summarizing the content can be a computationally expensive process. If one were to do these steps sequentially the time required would likely be noticeably long for large dataset, especially if there are a large number of clients. The problem gets exacerbated if there are a large number of clients and can quickly degrade the performance of computing instances.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 6 illustrates a flow diagram of an example method for maintaining the virtual inventory by a distributor, according to embodiments.

FIG. 7 illustrates a flow diagram of an example method for providing accessing to the virtual inventory to resellers, according to embodiments.

FIGS. 10A and 10B illustrate example data flow diagrams of systems for handling database queries, in accordance with various embodiments.

DESCRIPTION OF EMBODIMENTS

Figure 1:
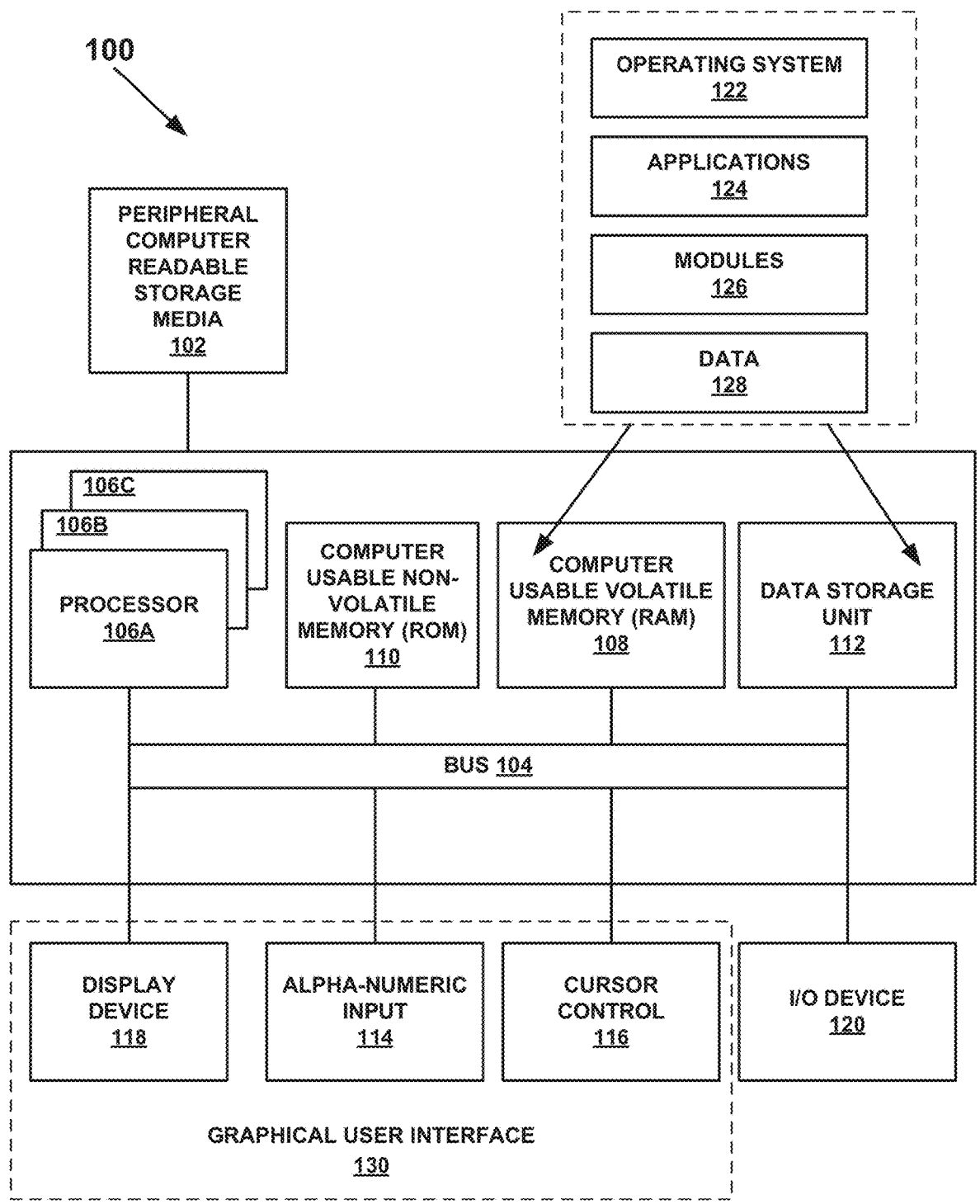
FIG. 1 is a block diagram of an example electronic device, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "maintaining," "providing," "effectuating," "transferring," "invoicing," "receiving," "deducting," "forwarding," "storing," "modifying," "searching," "returning," "performing," "registering," or the like, refer to the actions and processes of an electronic device such as: a processor, a memory, a mobile electronic device, a computer system, a server, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer network upon which embodiments of the present invention may be implemented. Example systems and methods for distribution of a regulated product in a three-tier system, in accordance with various embodiments, are then described. Example operations for distribution of a regulated product in a three-tier system, in accordance with various embodiments, are then described. Example methods and operation for resolving a query to a database, in accordance with various embodiments, are then described.

The alcohol distribution system utilized in the United States is largely unchanged since the passage of the 21$^{st}$ Amendment in 1933 overturning Prohibition. The prevailing alcohol distribution system of the United States is a three-tier system, with the three tiers being the suppliers (e.g., producers and importers), the distributors, and the resellers (e.g., restaurants, bars, and retailers). The basic structure of the three-tier system is that suppliers can sell their products only to distributors, who then sell to resellers, where only resellers may sell to consumers. While the specifics of how each state operates its three-tier system may differ, these states utilize and rely upon distributors to manage compliance and tax collection.

While the three-tier system provides tax collection and compliance management to state governments, the current distributor model places a premium on large suppliers while minimizing or, in many cases, cutting out opportunities for small suppliers, such as small wineries, distilleries, and breweries. The problems facing small suppliers in obtaining distribution has only exacerbated in recent years, as distributor and producer consolidation has effectively created a closed market that small suppliers are unable to access. Typically, to gain distribution, a supplier must be accepted by a distributor who will then distribute their product to resellers. However, even if a small supplier is able to obtain a distributor, the distributor may then fail to market or sell the product, may require an upfront and likely non-refundable financial commitment, and may require a buyback of unsold inventory.

In recent years, there has been a significant increase in the number of craft breweries, craft distilleries, and wineries, each of which desire a distributor to market and sell their beers, spirits, and wines to resellers. The difficulties of obtaining a distributor or receiving quality representation by a distributor is intensified by the influx of new suppliers coupled with the decrease in distributors due to consolidation.

Embodiments described herein provide alcoholic beverage companies of all size equal opportunity to sell their products to United States accounts in a legal and efficient manner. A new process for alcohol distribution is described. Instead of utilizing the traditional model of consolidation, shipping containers via truck or train, warehouses, delivery trucks and expensive salespeople, the described embodiments provide a cost effective model to get alcoholic beverages from the supplier (e.g., winery, distillery, or brewery) to the reseller (restaurant, wine shop, or liquor store).

Embodiments described herein provide computer-implemented systems and methods for providing business to business distribution of regulated products (e.g., alcohol products) within a three-tier system. While the embodiments herein describe a distribution system for alcohol products, it should be appreciated that the described embodiments are amenable to provide for the distribution of other regulated products, including without limitation: pharmaceutical products, cannabis products, hazardous materials, etc. Embodiments described herein improve the distribution of regulated products by leveraging a technological platform to remove artificial controls placed on suppliers and resellers by distributors. Suppliers are able to control products, pricing, and markets, while being enabled to directly market and communicate with resellers, while resellers are able to access products without being impeded by a distributor. Both suppliers and resellers are able to reduce costs and delays in payment, while having direct control over delivery of the regulated product.

A distributor maintains a virtual inventory of alcohol products within a database of a distribution system, where the virtual inventory is populated by suppliers of the alcohol products. The suppliers provide product information, sales market selections, and pricing information for each respective alcohol product offered. A sales market is a geographic region governed by a separate set of alcohol distribution laws. The pricing information includes a selling price for each sales market indicated by the sales market selection. The distribution system provides access to all sales markets for which the distributor is licensed to distribute the alcohol products.

Access to the virtual inventory of alcohol products is provided to resellers, where the alcohol products accessible to the resellers for purchase are based at least in part on sales markets and license types of the respective resellers. In one embodiment, a search query submitted by a reseller. In some embodiments, the search results are returned as identifiers of objects stored in the database, where each alcohol product has an associated object, without returning the object. The client device receives the identifiers of the objects and compares them to identifiers of objects stored in a cache of the client device. Based on the comparing, the client device determines whether any identifiers do not match identifiers stored in the local cache. The client device requests a subset of the objects corresponding to identifiers that do not match the identifiers of objects stored in the cache of the client device. The client device uses the objects for which the identifiers match when presenting the search results to the reseller. This allows for a faster return of search results, as objects that have not changed since the most recent retrieval can be accessed locally, without having to request the objects from the distribution computer system. For those objects of the subset that are requested, the objects can be requested and/or returned asynchronously.

Responsive to a purchase request from a reseller for a particular alcohol product, a purchase of the particular alcohol product is effectuated by the distributor from a supplier of the particular alcohol product. In one embodiment, the distributor takes legal possession of the particular alcohol product. In another embodiment, the distributor takes legal possession of the particular alcohol product without taking physical possession of the particular alcohol product.

Transport of the particular alcohol product from the supplier to the reseller is effectuated by the distributor, where the particular alcohol product is transported from the supplier to the reseller. In one embodiment, the particular alcohol product is transported from the supplier to the reseller without requiring the distributor to take physical possession of the particular alcohol product at the direction of the distributor. In another embodiment, the particular alcohol product is transported from the supplier to the reseller via an intermediary destination under control of the distributor (e.g., a licensed warehouse), subject to jurisdictional laws and regulations of the governing authority.

Legal possession of the particular alcohol product is transferred from the distributor to the reseller subsequent to the effectuating the purchase of the particular alcohol product and not later than a time of receipt of the particular alcohol product at the reseller.

Embodiments described herein provide a three-tier compliant web-based platform to sell wholesale alcohol, including technology-based tools and features that enable suppliers and resellers to easily control the alcohol distribution process from within the platform. For example, the features include geo-targeting sales, sophisticated pricing tools, precise search tools, and text notifications, for enhancing user experience (both on the supplier side and the reseller side). Embodiments of the described distribution systems include features that are accessible through a web interface. For example, suppliers and resellers can create an account and register via the distribution system. The web-based platform provides the reseller with a seamless e-commerce experience as well as invoicing, payment processing, collections, and taxes, allowing both suppliers and resellers to do business in a more open, efficient and cost-effective way.

Other embodiments described herein provide methods for resolving a query to a database in a manner that improves the response time to the query, thereby improving the performance of the underlying computer system. Described embodiments improve the technology of database search and query resolution by providing efficient and rapid delivery of search results, improving on conventional query resolution technology. Performance of a computer system is improved by only providing information that is necessary, and not needlessly reprocessing or retransmitting information that is already available, thereby not being wasteful of processing and network bandwidth, power consumption of mobile devices, time of the a user, etc. Moreover, the user experience is improved by quickly resolving search queries by reducing undesirable lags in presenting search results.

In one embodiment, a query for retrieving objects from a database is received at a computer system (e.g., a server). A candidate data set of objects is determined by applying the query to the database, where the candidate data set of objects includes identifiers of objects satisfying the query. In one embodiment, the identifiers are text labels uniquely identifying the object. In some embodiments, the identifiers also include a timestamp (e.g., generated at the time of creation of the object). The candidate data set of objects is transmitted to a client computing device as the identifiers and without transmitting the objects of the candidate data set.

At the client computing device, the identifiers of the candidate data set of objects are received and compared to identifiers of objects stored in a cache of the client computing device. In one embodiment, the client computing device first determines whether any identifiers of the candidate data set match any identifiers stored in the local cache. If any identifiers match, in one embodiment, the timestamps for the matching identifiers are compared. Based on the comparing, the client computing device determines whether any identifiers of the candidate data set do not match identifiers (and/or timestamps) stored in the local cache. The client computing device requests a subset of the objects corresponding to identifiers of the candidate data set of objects from the server computing system for identifiers of the candidate data set of objects that do not match the identifiers of objects stored in the cache of the client computing device.

The client computing device returns the candidate data set of objects using the objects stored in the local cache for those objects for which the identifiers (and timestamps) match. This allows for a faster return of search results, as objects that have not changed since the most recent retrieval can be accessed locally, without having to request the objects from the server. For those objects of the subset that are requested, the objects can be requested and/or returned asynchronously. The client computing device can generate multiple different subsets including different groups from the server, where the groups can also be returned from the server asynchronously.

Example Computer System and Network

Turning now to the figures, FIG. 1 is a block diagram of an example computer system 100. As will be appreciated, computer system 100 may be implemented as a device or apparatus, such as a mobile electronic device, a server, or any other type of computing device. For example, computer system 100 may be, without limitation, a mobile telephone phone (e.g., smartphone), a tablet computer, a laptop computer, a desktop computer, a server computer system, or a combination of one or more of these devices.

Turning now to the figures, FIG. 1 is a block diagram of an example computer system 100 upon which embodiments of the present invention can be implemented. FIG. 1 illustrates one example of a type of computer system 100 (e.g., a computer system) that can be used in accordance with or to implement various embodiments which are discussed herein.

It is appreciated that computer system 100 of FIG. 1 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 100 of FIG. 1 includes an address/data bus 104 for communicating information, and a processor 106A coupled with bus 104 for processing information and instructions. As depicted in FIG. 1, computer system 100 is also well suited to a multi-processor environment in which a plurality of processors 106A, 106B, and 106C are present. Conversely, computer system 100 is also well suited to having a single processor such as, for example, processor 106A. Processors 106A, 106B, and 106C may be any of various types of microprocessors. Computer system 100 also includes data storage features such as a computer usable volatile memory 108, e.g., random access memory (RAM), coupled with bus 104 for storing information and instructions for processors 106A, 106B, and 106C. Computer system 100 also includes computer usable non-volatile memory 110, e.g., read only memory (ROM), coupled with bus 104 for storing static information and instructions for processors 106A, 106B, and 106C. Also present in computer system 100 is a data storage unit 112 (e.g., a magnetic or optical disc and disc drive) coupled with bus 104 for storing information and instructions. Computer system 100 also includes an alphanumeric input device 114 including alphanumeric and function keys coupled with bus 104 for communicating information and command selections to processor 106A or processors 106A, 106B, and 106C. Computer system 100 also includes an cursor control device 116 coupled with bus 104 for communicating user input information and command selections to processor 106A or processors 106A, 106B, and 106C. In some embodiments, computer system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. Computer system 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with computer system 100 through graphical representations presented on display device 118 by interacting with alphanumeric input device 114 and/or cursor control device 116.

It should be appreciated that in accordance with some embodiments, a computer system 100 may not include a display device 118, alphanumeric input device 114, and/or cursor control device 116. In some such embodiments, the computer system 100 may communicate with another computer system (e.g., another computer system 100) including a display device 118, alphanumeric input device 114, and/or cursor control device 116, for allowing a user to interact with the computer system 100. For example, in a client-server model, a computer system 100 implemented as a server device may utilize a computer system 100 implemented as a client device for providing user interaction with the server device through a display device 118, alphanumeric input device 114, and/or cursor control device 116 of the client device.

In some embodiments, computer system 100 also includes an I/O device 120 for coupling computer system 100 with external entities. For example, in one embodiment, I/O device 120 is a modem for enabling wired or wireless communications between computer system 100 and an external network such as, but not limited to, the Internet. In one embodiment, I/O device 120 includes a transmitter. Computer system 100 may communicate with a network by transmitting data via I/O device 120.

Referring still to FIG. 1, various other components are depicted for computer system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Figure 2:
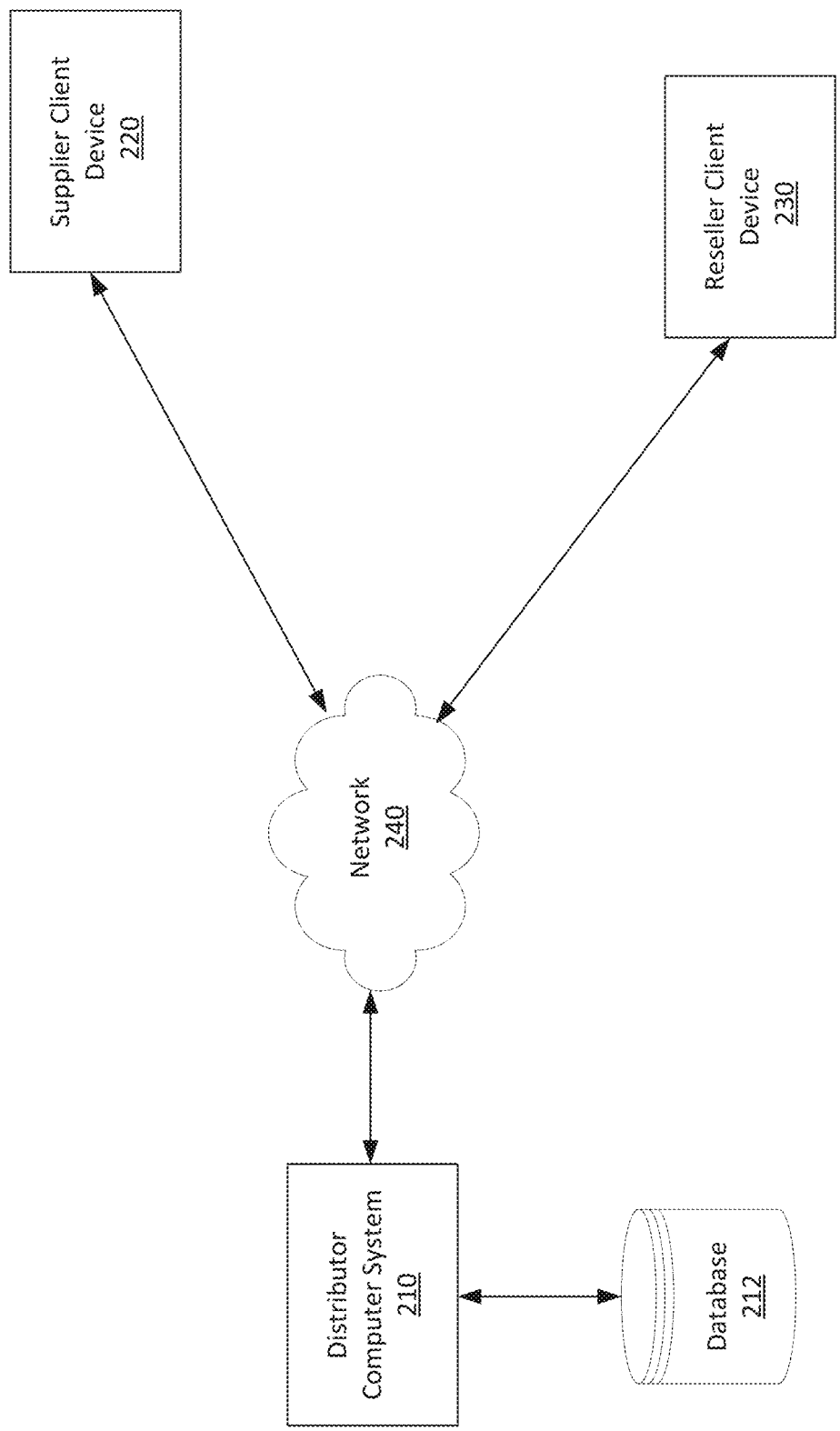
FIG. 2 illustrates an example network upon which embodiments described herein may be implemented.

FIG. 2 illustrates an example communication network 240 upon which embodiments described herein may be implemented. FIG. 2 illustrates distributor computer system 210, supplier client device 220, and reseller client device 230, which are communicatively coupled via network 240. It should be appreciated that distributor computer system 210, supplier client device 220, and/or reseller client device 230 may be implemented as an computer system 100, and/or include any combination of the components of computer system 100. For example, in one embodiment, distributor computer system 210 is a distributed server computer system that is accessible by supplier client device 220 and reseller client device 230. It should be appreciated that there can be any number of supplier client devices 220 and reseller client devices 230, of which the illustrated embodiment of FIG. 2 is one example. For example, there may be hundreds or thousands of different supplier client devices 220 and reseller client devices 230. Moreover, it should be appreciated that the same device may operate as both a supplier client device 220 and a reseller client device 230.

In accordance with various embodiments, distributor computer system 210 is a server, which may include one or more processors, computer systems, or computing devices. Distributor computer system 210 is communicably coupled to one or more databases 212. The databases 212 may include redundancy/backup capabilities and may be in different geographic locations. The databases 212 can be communicably coupled to the distributor computer system 210 by direct connections, wireless connections, through other computers or through a local or wide area network (e.g., network 240), or any other suitable communication connection. The databases 212 store various data, files, profiles, sessions, programs and other information required to operate the described embodiments.

Systems and Methods of Operation for Distribution of Regulated Products

Figure 3:
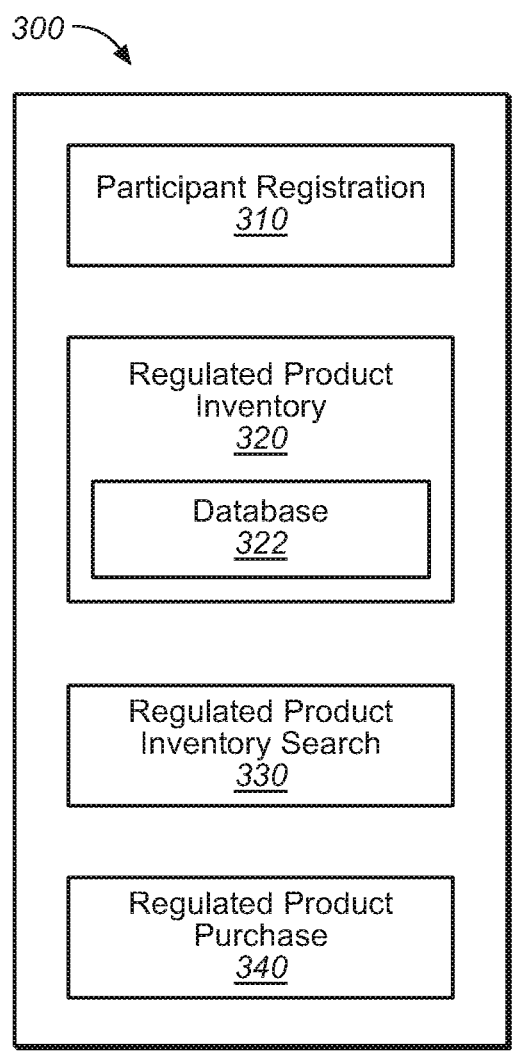
FIG. 3 illustrates an example system for distribution of a regulated product, according to an embodiment.

FIG. 3 illustrates an example system 300 for business to business regulated product distribution, in accordance with various embodiments. System 300 is configured to provide a distributor-managed platform for providing regulated product distribution (e.g., alcoholic beverages) to suppliers (e.g., producers and importers) and resellers (e.g., restaurants, bars, and retailers) that satisfies the regulatory requirements of a three-tier distribution system. It should be appreciated that system 300 can be implemented as hardware, software, or any combination thereof. In some embodiments, individual components of system 300 may be distributed over multiple computing devices. For example, with reference to FIG. 2, system 300 may be distributed across distributor computer system 210, supplier client device 220, and reseller client device 230. In one example, the client devices include a web application or mobile application that performs some operations of system 300, while distributor computer system 210 performs other operations, as will be described below.

Participant registration component 310 is configured to receive registration requests from potential participants, validate the licensing of the potential participants, and to maintain a profile of registered participants. In one embodiment, participant registration component 310 receives information submitted via a client device (e.g., supplier client device 220 or reseller client device 230) and is received at distributor computer system 210. The client device may provide a web application or mobile application for receiving user information. In some embodiments, the graphical user interface is maintained and generated at the client device, such that only the submitted information is transmitted to distributor computer system 210. In other embodiments, distributor computer system 210 serves the information to be rendered at the client device to the client device.

Participant registration component 310 receives a registration request including registration information and license from potential participants. For example, the registration information may include a user name, a password for, and acceptance to certain contractual terms and conditions that create a legally binding electronic signature for the party. The registration request will also include a location for identifying a sales market and at least one license for verification. A sales market is a geographic region governed by a separate set of alcohol distribution laws. Suppliers and resellers are governed by the laws of the sales markets in which they are participating.

In order to participate in the described computer-implemented systems and methods for providing business to business distribution of regulated products, participants (e.g., suppliers and resellers) must register with the distributor. Alcohol distribution within the United States is governmentally regulated, and a license from at least one governmental agency (e.g., Federal, state, or county regulating authority) is required. At the Federal level, the Alcohol and Tobacco Tax and Trade Bureau (TTB) enforce the laws regulating alcohol production, importation, and wholesale businesses. Each state has its own alcohol control board or governing authority for regulating the production and sale of alcoholic beverages. Moreover, in some states, counties may also have their own alcohol control boards or governing authorities for regulating the production and sale of alcoholic beverages within the county.

Furthermore, each governing authority typically provides a large number of license types for both suppliers and resellers. For example, licenses may be available for different types of alcoholic beverages, such as wine, beer, or spirits. The different types of alcoholic beverages may be broken down into a more granular level (e.g., brandy manufacturer license, distilled spirits, etc.) Moreover, license types may be based on whether a reseller provides on-premises or off-promises consumption of alcohol (e.g., a bar/restaurant typically provides on-premises consumption and a wine shop provides off-premises consumption). It should be appreciated that each participant will have at least one license and that the license type defines the alcohol products available for sale or purchase by the respective participant.

In some embodiments, participant registration component 310 is configured to automatically perform verification of the submitted license of a potential participant. The license information may be submitted in a variety of formats, such as a license number and identification of the regulating authority, an electronic image of the license, etc. Many regulating authorities provide online accessible license verification systems. The submitted license may be verified using the appropriate information for the corresponding regulating authority. For example, where the regulating authority allows for license verification via a license number, participant registration component 310 verifies the license via the license number of a submitted license. It should be appreciated that many different types of information may be used to verify a license, such as, and without limitation, a license number, a business/licensee name, a business address, etc. Where an image of the license is submitted, the searchable information may be extracted from the image (e.g., via optical character recognition) for submission to a license verification system of a regulating authority). It should also be appreciated that a license can be manually verified if the automatic verification fails for some reason (e.g., typographical errors or optical character recognition errors). In some embodiments, participant registration component 310 is configured to determine an expiration date of a license and perform verification that a license has been renewed prior to the expiration date, thus ensuring continuity of the license for participation in the described distribution system.

Upon confirmation of a license, participant registration component 310 registers the participant with the described distribution system. The participant is registered as either a supplier or a reseller, depending on the information submitted and the license type. In some embodiments, a profile is maintained for each participant. The profile includes a license type and a sales market for each participant. Once registered, the participant is able to access the distribution system using the submitted username and password. It should be appreciated that suppliers and resellers are able to access different information via the distribution system, and that participant registration component 310 identifies whether the participant is a supplier or reseller based on the registration information and submitted license.

As part of the registration process, or subsequent to registration, participant registration component 310 allows for a participant to provide contact information (e.g., name, email address, phone number, mailing address, etc.), brand information (for suppliers), business profile (for resellers), photographs, logos, media, etc.

Regulated product inventory 320 is a virtual inventory of the distributor that includes all regulated products available for purchase via the described distribution system. Regulated product inventory 320 is populated by suppliers of the regulated products, where the suppliers provide product information, sales market selection, and pricing information for each respective regulated product. Product information includes information about the product including without limitation: product name, type of product (e.g., beer, wine, spirit, etc.), location of manufacture, date of manufacture, alcohol content (e.g., alcohol percentage, proof, etc.), amount produced (e.g., cases, bottles, etc.), product images, product labels, TTB Certification/Exemption of Label/Bottle Approval (COLA) identifier (ID), etc. It should be appreciated that the virtual inventory may include regulated products that are under the control (e.g., ownership) of suppliers and/or the distributor. In other words, the distributor may also have ownership/possession of regulated products within regulated product inventory 320.

In one embodiment, regulated product inventory 320 receives product information submitted via a client device (e.g., supplier client device 220) and is received at distributor computer system 210. The client device may provide a web application or mobile application for receiving user information. In some embodiments, the graphical user interface is maintained and generated at the client device, such that only the submitted information is transmitted to distributor computer system 210. In other embodiments, distributor computer system 210 serves the information to be rendered at the client device to the client device.

For example, a particular regulated product may have different pricing information for different sales markets. The pricing information includes a selling price for each sales market indicated by the sales market selection. In one embodiment, regulated product inventory 320 includes database 322 for storing the regulated product information.

Regulated product inventory search component 330 provides search capabilities of the virtual inventory to resellers of the distribution system. In one embodiment, regulated product inventory search component 330 receives a search query submitted at a client device (e.g., reseller client device 230) and is received at distributor computer system 210. The client device may provide a web application or mobile application for receiving user information. In some embodiments, the graphical user interface is maintained and generated at the client device, such that only the submitted information is transmitted to distributor computer system 210. In other embodiments, distributor computer system 210 serves the information to be rendered at the client device to the client device.

The search query may include any information used to search the virtual inventory of regulated products. For example, resellers may search for wine, beer and spirits based on type, variety, ratings, price, region, vintage, and brand, etc.

In some embodiments, the search query is modified according to the sales market and license type of the reseller submitting the search. Since the sales market and license type dictates product availability to particular resellers, in addition to pricing information, the search query is modified to limit the search results to only the information that is available to the searching reseller. In some embodiments, only the regulated products available for purchase by a reseller are presented to the reseller. For instance, if a reseller is only licensed to resell beer, the search query is modified such that the search results will only sell beer, such that wine and spirits will not be presented to the reseller. In another example, wherein a reseller is located in California, only pricing information for the California sales market will be presented. In this way, the search is tailored to the searching reseller while maintaining strict compliance controls that eliminate the potential purchase of regulated products that the reseller is not licensed to purchase.

In one embodiment, the search query is modified at the client device receiving the search query prior to transmitting to distributor computer system 210, such that distributor computer system 210 only receives the modified query. In another embodiment, the search query is modified upon receipt at the distributor computer system 210.

Upon receiving the modified search query, the virtual inventory is searched for regulated products satisfying the modified search request. Search results are returned to the client device, where the search results include regulated alcohol products available for purchase by the reseller based on the sales market of the reseller and the license type of the reseller. The search results also include pricing information for the regulated products available for purchase by the reseller for the sales market of the reseller.

In some embodiments, the search results are returned as identifiers of objects stored in the database, where each alcohol product has an associated object, without returning the object. The client device receives the identifiers of the objects and compares them to identifiers of objects stored in a cache of the client device. Based on the comparing, the client device determines whether any identifiers do not match identifiers stored in the local cache. The client device requests a subset of the objects corresponding to identifiers that do not match the identifiers of objects stored in the cache of the client device. The client device uses the objects for which the identifiers match when presenting the search results to the reseller. This allows for a faster return of search results, as objects that have not changed since the most recent retrieval can be accessed locally, without having to request the objects from the distribution computer system. For those objects of the subset that are requested, the objects can be requested and/or returned asynchronously. In some embodiments, the resolving of the search query is performed as described below, in accordance with FIGS. 10A through 13.

Regulated product purchase component 340 provides for the purchase of a regulated product by a reseller from the supplier via the distributor. In one embodiment, a purchase request is received from a client device of a reseller (e.g., reseller client device 230) and is received at distributor computer system 210. The client device may provide a web application or mobile application for receiving user information. In some embodiments, the graphical user interface is maintained and generated at the client device, such that only the submitted information is transmitted to distributor computer system 210. In other embodiments, distributor computer system 210 serves the information to be rendered at the client device to the client device.

In response to receiving a purchase request from a reseller for a particular regulated product, regulated product purchase component 340 effectuates purchase of the particular regulated product by the distributor from a supplier of the particular regulated product. In some embodiments, the distributor takes legal possession of the particular regulated product without taking physical possession of the particular alcohol product.

Regulated product purchase component 340 also effectuates transport of the particular regulated product from the supplier to the reseller. For example, the distributor may direct the supplier to ship the regulated product to the reseller via a common carrier (e.g., Federal Express or United Parcel Service), in accordance with laws and regulations controlling the transport of the regulated product. In one embodiment, the particular regulated product is transported from the supplier to the reseller without requiring the distributor to take physical possession of the particular alcohol product. Regulated product purchase component 340 also transfers legal possession of the particular regulated product from the distributor to the reseller at some point in time subsequent to effectuating the purchase of the particular regulated product and not later than a time of receipt of the particular regulated product at the reseller.

In some embodiments, regulated product purchase component 340 is configured to invoice the reseller of the particular regulated product based at least in part on the pricing information for the market of the reseller and to receive payment from the reseller in response to the invoicing. It should be appreciated that payment can be received in any number of ways, including without limitation, credit cards, checks, electronic bank transfers, online payment systems, etc. Regulated product purchase component 340 is also configured to deduct applicable charges from the purchase of the particular regulated product, the applicable charges including taxes and distribution transaction costs. The applicable charges may also include transportation costs in some embodiments. Distribution transaction costs include the distributor's fee, and may be in a fixed amount or a percentage of the total invoiced. Subsequent confirmation of receipt of the particular regulated product at the reseller, system 300 forwards the payment minus any applicable charges to the supplier. In this way, system 300 operates as an escrow provider for ensuring receipt of the particular regulated product prior to remunerating the supplier.

The following discussion sets forth in detail the operation of some example methods of operation of embodiments. With reference to FIGS. 4 through 8, flow diagrams 400, 500, 550, 600, 700, and 800 illustrate example procedures used by various embodiments. Flow diagrams 400, 500, 550, 600, 700, and 800 include some procedures that, in various embodiments, are carried out by a processor under the control of computer-readable and computer-executable instructions. In this fashion, procedures described herein and in conjunction with flow diagrams 400, 500, 550, 600, 700, and 800 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 100, distributor computer system 210, supplier client device 220, and/or reseller client device 230). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 400, 500, 550, 600, 700, and 800 such procedures are examples. That is, embodiments are well suited to performing various other procedures or variations of the procedures recited in flow diagrams 400, 500, 550, 600, 700, and 800. Likewise, in some embodiments, the procedures in flow diagrams 400, 500, 550, 600, 700, and 800 may be performed in an order different than presented and/or not all of the procedures described in one or more of these flow diagrams may be performed. It is further appreciated that procedures described in flow diagrams 400, 500, 550, 600, 700, and 800 may be implemented in hardware, or a combination of hardware with firmware and/or software provided by computer system 100, distributor computer system 210, supplier client device 220, and/or reseller client device 230.

Figure 4:
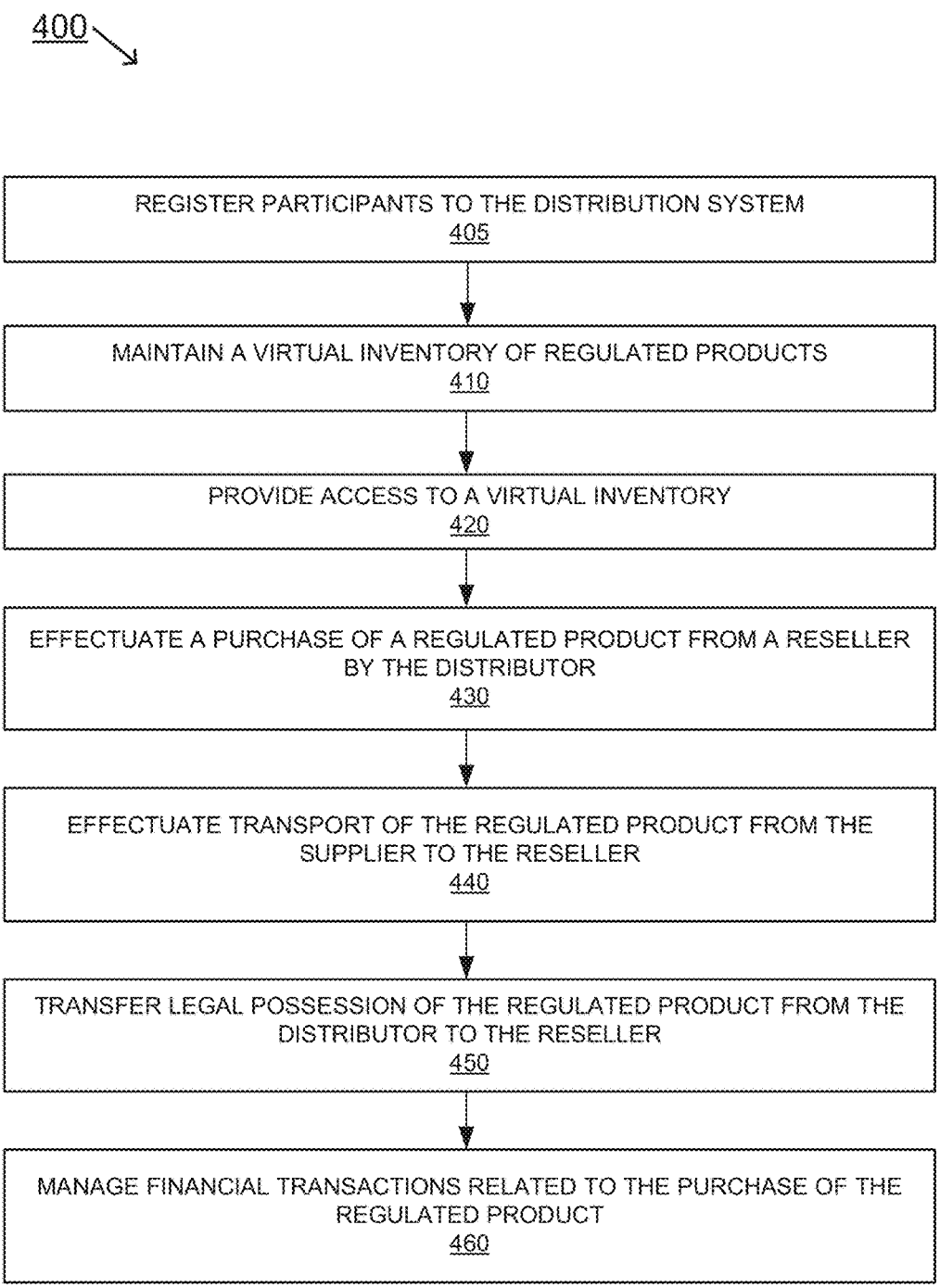
FIG. 4 illustrates a flow diagram of an example method for providing business to business alcohol product distribution, according to various embodiments.

FIG. 4 illustrates a flow diagram 400 of an example method for providing business to business alcohol product distribution, according to various embodiments. In one embodiment, as shown at procedure 405 of flow diagram 400, participants are registered with a business to business alcohol product distribution system. As part of the participant authorization procedure, the distribution system described herein identifies the participant as either a supplier or a reseller. A supplier (e.g., a producer or importer) of the described distribution system is enabled to populate the virtual inventory of the distribution system with regulated products that are available for purchase from the supplier. A reseller (e.g., a restaurant, a bar, or a retailer) of the described distribution system is enabled to search the virtual inventory of the distribution system regulated products that are available for purchase by the reseller. In some embodiments, the registration process receives information from the potential participant at a client device (e.g., supplier client device 220 or reseller client device 230) and communicates the information to distributor computer system 210. The client device may provide a web application or mobile application for receiving and communicating the information.

As the distribution system described herein concerns the distribution of governmentally regulated products (e.g., alcohol), the distribution system confirms that a participant is legally authorized to participate in the distribution of the regulated products. For example, as part of the registration process, the participant provides license information pertaining to their legal distribution of the regulated product.

Figure 5A:
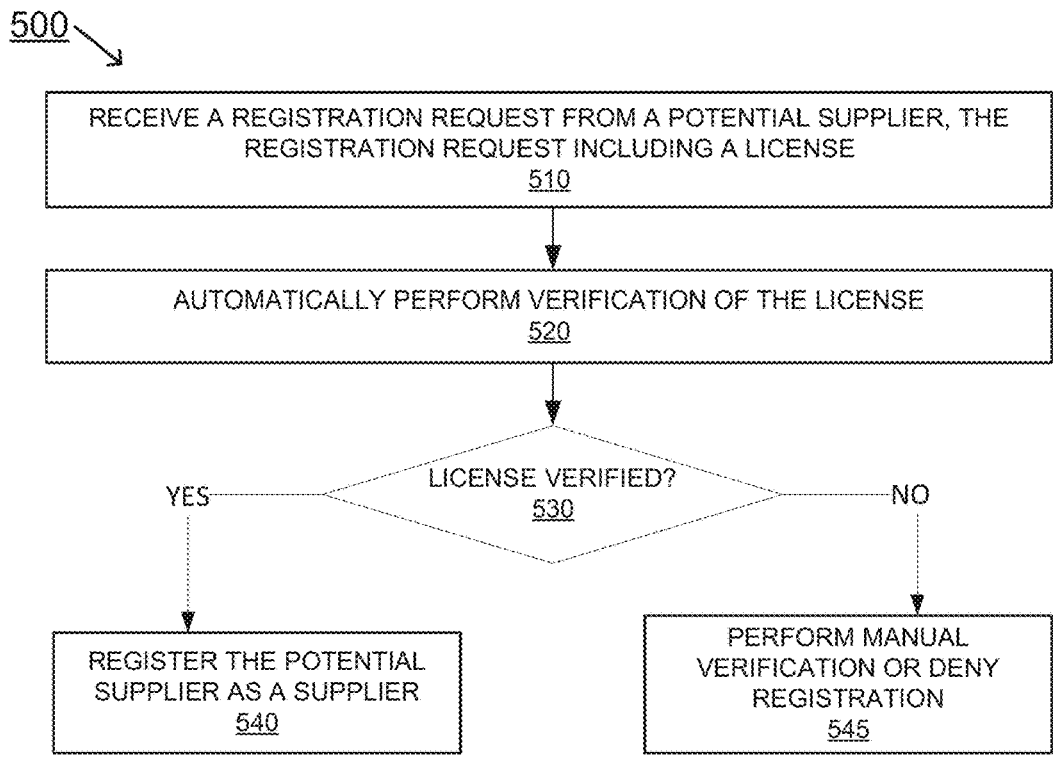
FIG. 5A illustrates a flow diagram of an example method for registering a supplier with the described distribution system, according to an embodiment.
Figure 5B:
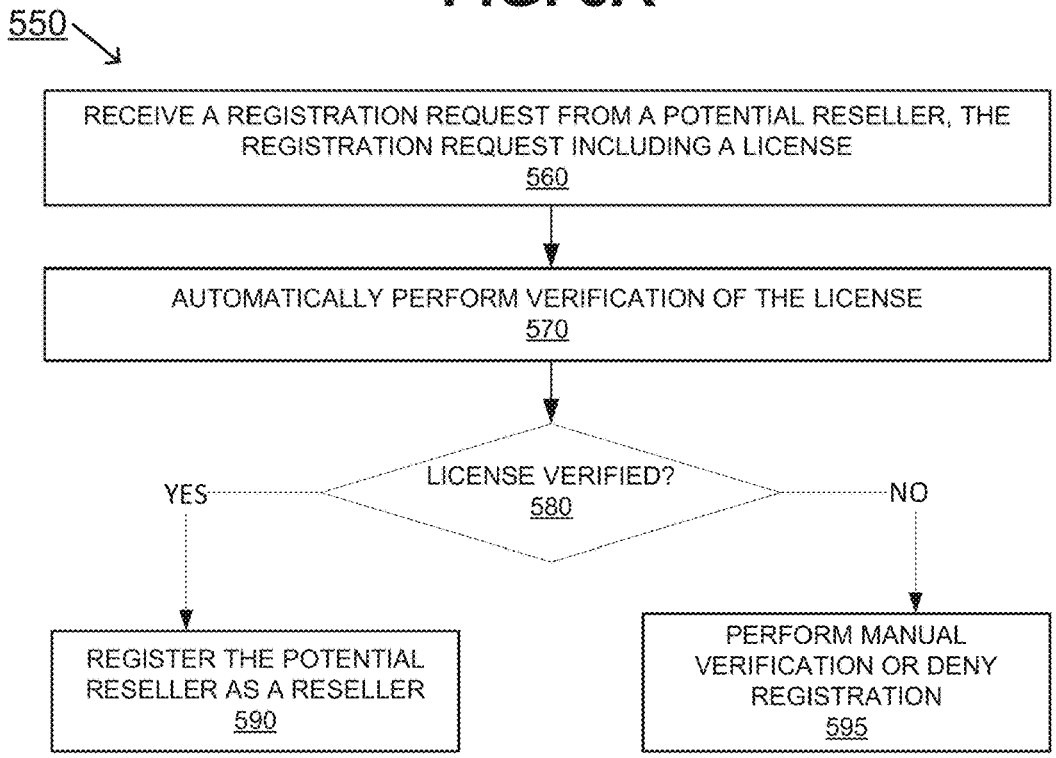
FIG. 5B illustrates a flow diagram of an example method for registering a reseller with the described distribution system, according to an embodiment.

With reference to FIGS. 5A and 5B, flow diagrams 500 and 550 are shown of example methods of registering participants with the described distribution system, according to embodiments. As illustrated in FIG. 5A, flow diagram 500 of an example method for registering a supplier with the described distribution system, according to an embodiment. At procedure 510 of flow diagram 500, a registration request is received from a potential supplier, where the registration request includes a license or license information (e.g., a license number and identification of the regulating authority). It should be appreciated that other information may also be submitted as part of the registration request, e.g., business contact information, username, password, etc.

At procedure 520, automatic verification of the license is performed. For example, many regulating authorities provide online accessible license verification systems. The submitted license or license information may be verified using the appropriate information for the corresponding regulating authority. For example, where the regulating authority allows for license verification via a license number, the distribution system automatically verifies the license by confirming the submitted license number with the regulating authority. In some embodiments, the content of the license is compared to other submitted information (e.g., contact information) to provide further licensing verification.

At procedure 530, it is determined whether the license is verified. If the license is verified, as illustrated at procedure 540, the potential supplier is registered with the distribution system as a supplier, and is provided access to the distribution system. If the license is not verified, as illustrated at procedure 545, additional verification procedures may be performed (e.g., manual verification) or the registration may be denied. For example, a license number may be entered incorrectly into the distribution system. An electronic communication may be transmitted to the potential supplier informing the potential supplier that the license information submitted is not valid, and to confirm correct entry of the license information. Where the license information was submitted as an electronic image, a representative of the distribution system can manually inspect the electronic image to confirm the proper information was submitted to the verification system of the regulating authority. A representative of the distribution system can also communicate directly with the potential supplier to confirm license information for resubmission to the verification system of the regulating authority.

As illustrated in FIG. 5B, a flow diagram 550 of an example method for registering a reseller with the described distribution system, according to an embodiment. At procedure 560 of flow diagram 550, a registration request is received from a potential reseller, where the registration request includes a license or license information (e.g., a license number and identification of the regulating authority). It should be appreciated that other information may also be submitted as part of the registration request, e.g., business contact information, username, password, etc.

At procedure 570, automatic verification of the license is performed. For example, many regulating authorities provide online accessible license verification systems. The submitted license or license information may be verified using the appropriate information for the corresponding regulating authority. For example, where the regulating authority allows for license verification via a license number, the distribution system automatically verifies the license by confirming the submitted license number with the regulating authority. In some embodiments, the content of the license is compared to other submitted information (e.g., contact information) to provide further licensing verification.

At procedure 580, it is determined whether the license is verified. If the license is verified, as illustrated at procedure 590, the potential reseller is registered with the distribution system as a reseller, and is provided access to the distribution system. If the license is not verified, as illustrated at procedure 595, additional verification procedures may be performed (e.g., manual verification) or the registration may be denied. For example, a license number may be entered incorrectly into the distribution system. An electronic communication may be transmitted to the potential reseller informing the potential reseller that the license information submitted is not valid, and to confirm correct entry of the license information. Where the license information was submitted as an electronic image, a representative of the distribution system can manually inspect the electronic image to confirm the proper information was submitted to the verification system of the regulating authority. A representative of the distribution system can also communicate directly with the potential reseller to confirm license information for resubmission to the verification system of the regulating authority.

Returning to FIG. 4, at procedure 410, a virtual inventory of alcohol products is maintained by a distributor, where the virtual inventory is populated by suppliers of the alcohol products. The suppliers provide product information, sales market selection, and pricing information for each respective alcohol product. A sales market is a geographic region governed by a separate set of alcohol distribution laws, and the pricing information includes a selling price for each sales market indicated by the sales market selection. In some embodiments, the distribution system receives product information from a client device (e.g., supplier client device 220) and communicates the information to distributor computer system 210. The distributor computer system maintains the virtual inventory.

The described distribution system is operable to maintain the virtual inventory of the distributor that includes all regulated products available for purchase via the described distribution system. Product information includes information about the product including without limitation: product name, type of product (e.g., beer, wine, spirit, etc.), location of manufacture, date of manufacture, alcohol content (e.g., alcohol percentage, proof, etc.), amount produced (e.g., cases, bottles, etc.), product images, product labels, TTB Certification/Exemption of Label/Bottle Approval (COLA) identifier (ID), etc.

Pricing information for the regulated product is submitted on a sales market basis. For example, a particular regulated product may have different pricing information for different sales markets. The pricing information includes a selling price for each sales market indicated by the sales market selection. In one embodiment, the product information and pricing information for the regulated products is maintained in a database of the described distribution system.

With reference to FIG. 6, flow diagram 600 is shown of an example method of maintaining the virtual inventory by a distributor, according to embodiments. At procedure 610 of flow diagram 600, product information, sales market selection, and pricing information for a regulated product is received. At procedure 620, the product information, sales market selection, and pricing information is stored at a database of the distribution system.

Returning to FIG. 4, at procedure 420, access to the virtual inventory of alcohol products is provided to resellers, where the alcohol products accessible to the resellers for purchase are based at least in part on sales markets and license types of the respective resellers. In various embodiments, the described distribution system provides search capabilities of the virtual inventory to resellers of the distribution system. In some embodiments, the distribution system receives a search request from a client device (e.g., reseller client device 230) and communicates the information to distributor computer system 210.

With reference to FIG. 7, flow diagram 700 is shown of an example method of providing accessing to the virtual inventory to resellers, according to embodiments. At procedure 705 of flow diagram 700, a search request (e.g., a search query) from a reseller is received. At procedure 710, the search request is modified according to the sales market and license type of the reseller submitting the search. Since the sales market and license type dictates product availability to particular resellers, in addition to pricing information, the search query is modified to limit the search results to only the information that is available to the searching reseller. In some embodiments, only the regulated products available for purchase by a reseller may be presented to the reseller. For instance, if a reseller is only licensed to resell beer, the search query is modified such that the search results will only sell beer, such that wine and spirits will not be presented to the reseller. In another example, wherein a reseller is located in California, only pricing information for the California sales market will be presented. In this way, the search is tailored to the searching reseller while maintaining strict compliance controls that eliminate the potential purchase of regulated products that the reseller is not licensed to purchase.

At procedure 720, upon receiving the modified search query, the virtual inventory is searched for regulated products satisfying the modified search request. At procedure 730, search results are returned to the searching reseller, where the search results include regulated alcohol products available for purchase by the reseller based on the sales market of the reseller and the license type of the reseller. The search results also include pricing information for the regulated products available for purchase by the reseller for the sales market of the reseller.

In some embodiments, the search results are returned as identifiers of objects stored in the database, where each alcohol product has an associated object, without returning the object. The client device receives the identifiers of the objects and compares them to identifiers of objects stored in a cache of the client device. Based on the comparing, the client device determines whether any identifiers do not match identifiers stored in the local cache. The client device requests a subset of the objects corresponding to identifiers that do not match the identifiers of objects stored in the cache of the client device. The client device uses the objects for which the identifiers match when presenting the search results to the reseller. This allows for a faster return of search results, as objects that have not changed since the most recent retrieval can be accessed locally, without having to request the objects from the distribution computer system. For those objects of the subset that are requested, the objects can be requested and/or returned asynchronously. In some embodiments, the resolving of the search query is performed as described below, in accordance with FIGS. 10A through 13.

At procedure 430, responsive to a purchase request from a reseller for a particular alcohol product, a purchase of the particular alcohol product by the distributor from a supplier of the particular alcohol product is effectuated. In one embodiment, the distributor takes legal possession of the particular alcohol product without taking physical possession of the particular alcohol product. In some embodiments, the distribution system receives a purchase request from a client device (e.g., supplier client device 220) and communicates the purchase request to another client device (e.g., reseller client device 230) from distributor computer system 210.

At procedure 440, transport of the particular alcohol product from the supplier to the reseller is effectuated by the distributor. In some embodiments, the distribution system communicates the transport information to a client device (e.g., supplier client device 220) from distributor computer system 210.

In one embodiment, the particular alcohol product is transported from the supplier to the reseller without requiring the distributor to take physical possession of the particular alcohol product at the direction of the distributor. In another embodiment, the particular alcohol product is transported from the supplier to the reseller via an intermediary destination under control of the distributor (e.g., a licensed warehouse), subject to jurisdictional laws and regulations of the governing authority.

At procedure 450, legal possession of the particular alcohol product is transferred from the distributor to the reseller subsequent to the effectuating the purchase of the particular alcohol product and not later than a time of receipt of the particular alcohol product at the reseller. Legal possession is tracked at distributor computer system 210, and notice of the transfer of legal possession is communicated from distributor computer system 210 to a client device (e.g., reseller client device 230).

In one embodiment, as shown at procedure 460, financial transactions related to the purchase of the alcohol product are managed by the distributor. The financial transactions are tracked at distributor computer system 210 and appropriate notices (e.g., invoicing, transfer of funds, and payment of taxes) is communicated from distributor computer system 210 to a client device (e.g., supplier client device 220 and/or reseller client device 230).

Figure 8:
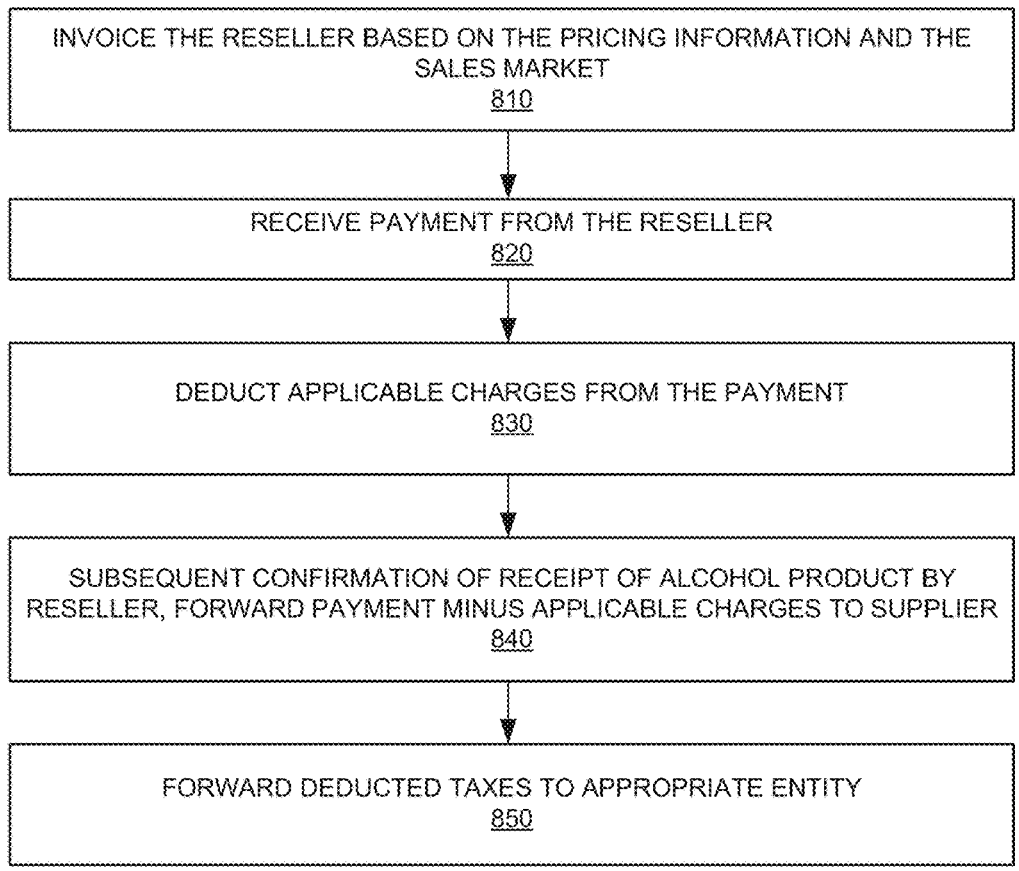
FIG. 8 illustrates a flow diagram of an example method for managing financial transactions related to the purchase of the alcohol product, according to embodiments.

With reference to FIG. 8, flow diagram 800 is shown of an example method of managing financial transactions related to the purchase of the alcohol product, according to embodiments. At procedure 810 of flow diagram 800, the reseller of the purchased alcohol product is invoiced based at least in part on the pricing information for the sales market of the reseller. At procedure 820, payment from the reseller is received in response to the invoicing. It should be appreciated that payment can be received in any number of ways, including without limitation, credit cards, checks, electronic bank transfers, online payment systems, etc.

At procedure 830, applicable charges are deducted from the payment, the applicable charges including taxes and distribution transaction costs. The applicable charges may also include transportation costs in some embodiments. Distribution transaction costs include the distributor's fee, and may be in a fixed amount or a percentage of the total invoiced.

At procedure 840, subsequent confirmation of receipt of the particular regulated product at the reseller, the payment minus any applicable charges is forwarded to the supplier. In one embodiment, as shown at procedure 850, the deducted taxes are forwarded to the appropriate entity identified by the regulating authority.

Figure 9A:
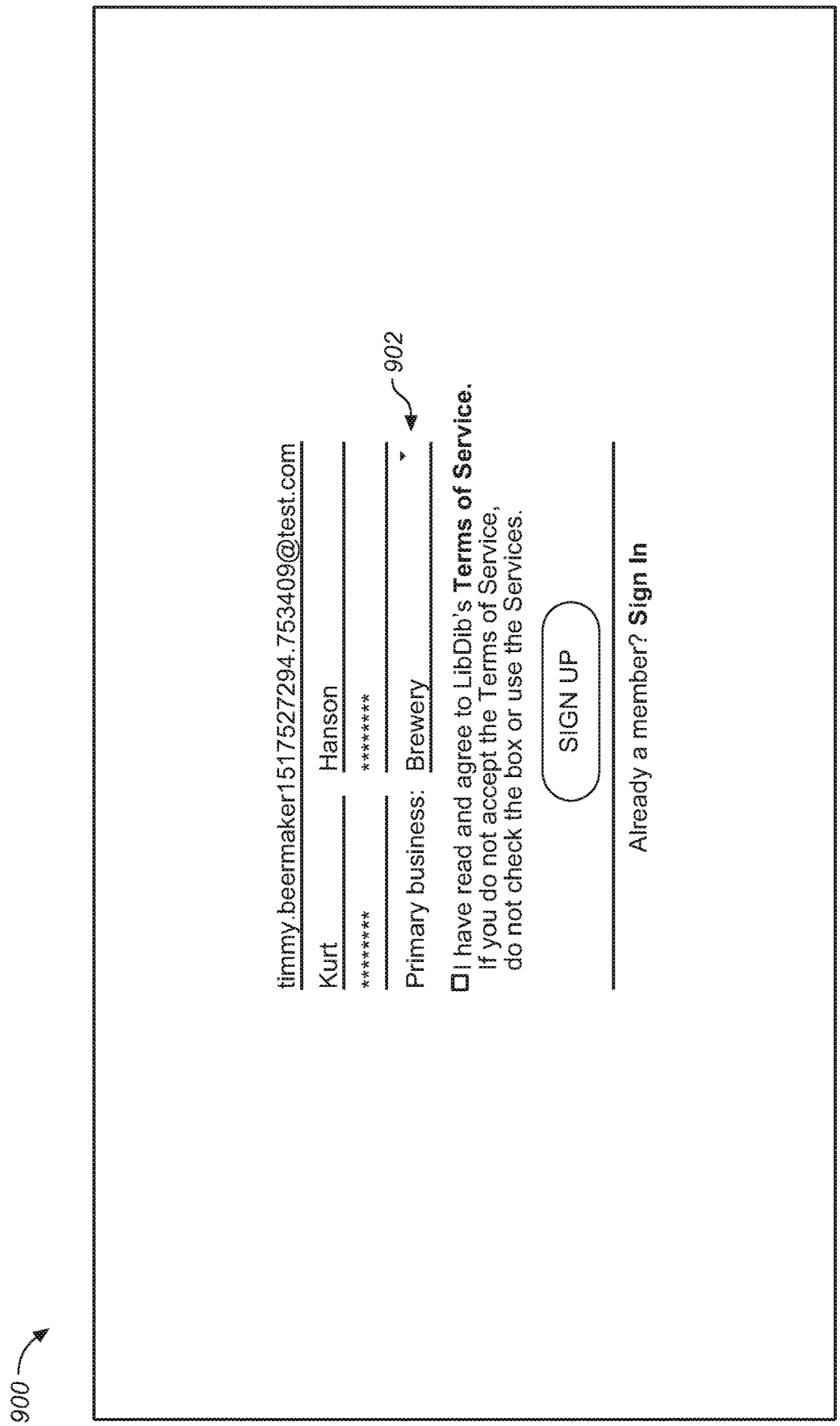
FIGS. 9A through 9R are example screen shots of a graphical user interface of a business to business alcohol product distribution system, in accordance with various embodiments.
Figure 9F:
Figure 9G:
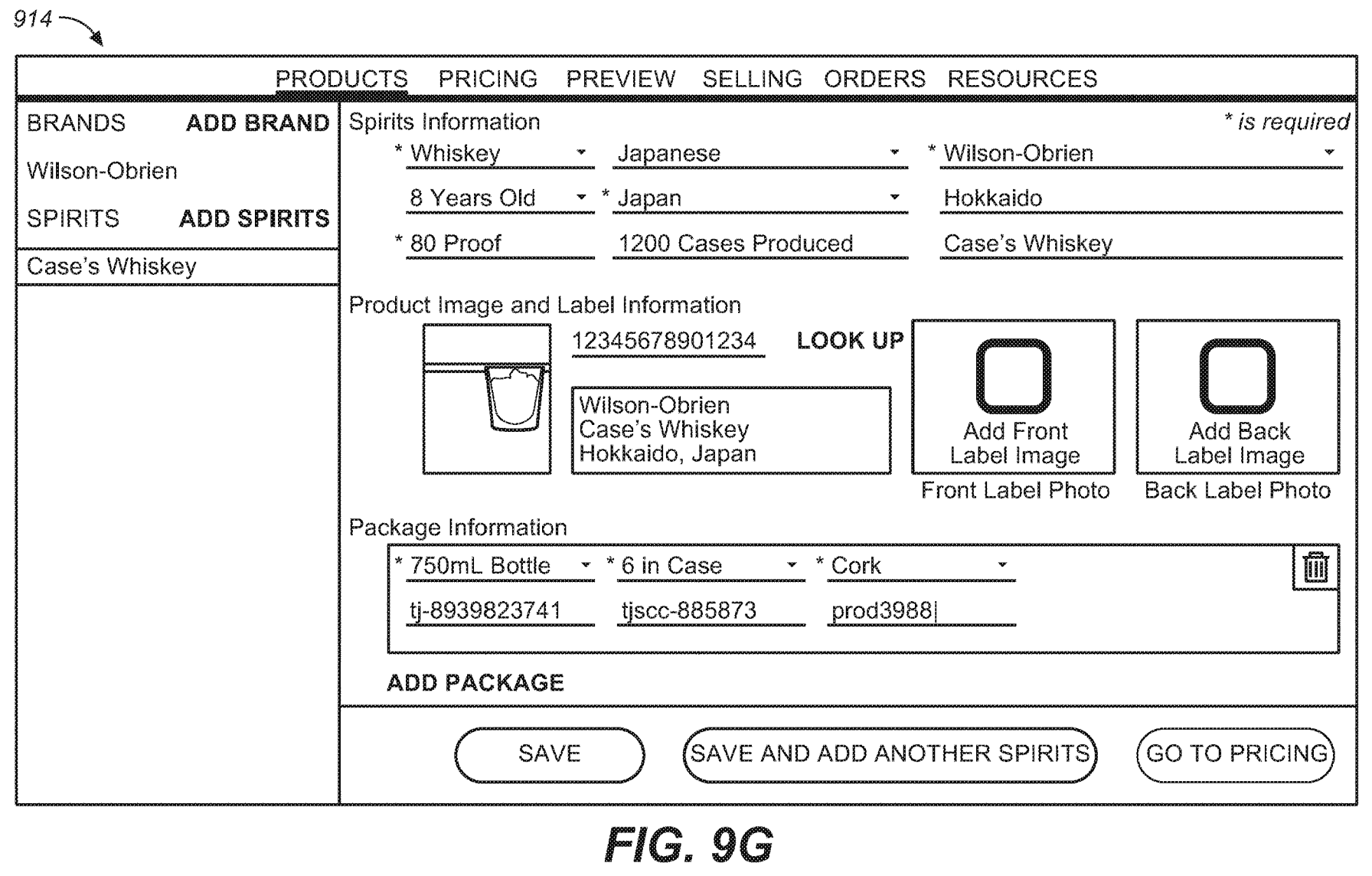
Figure 9H:
Figure 9I:
Figure 9J:
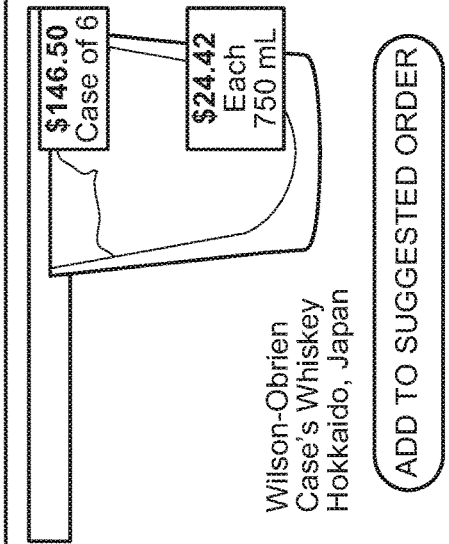
Figure 9L:
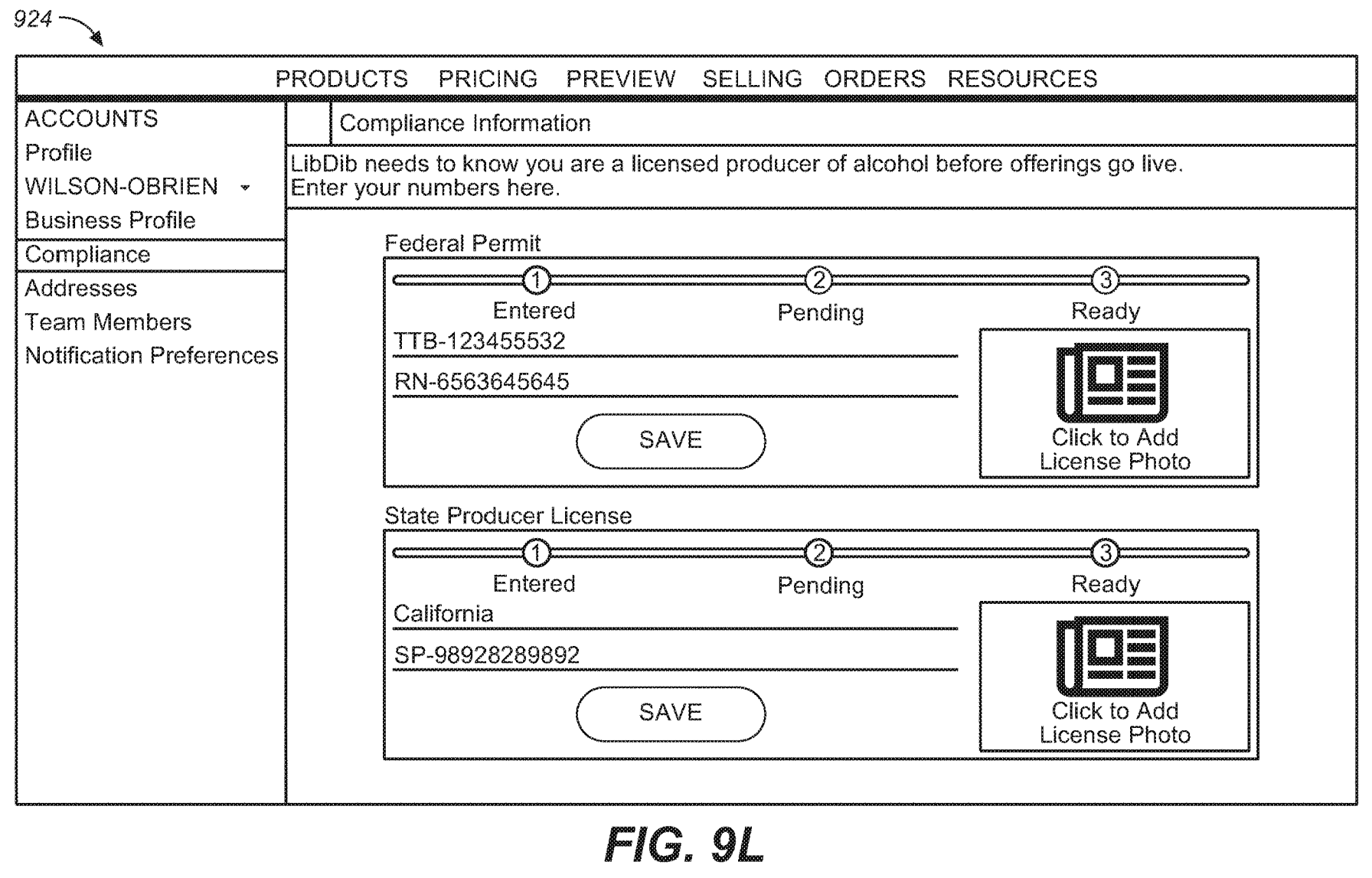
Figure 9M:
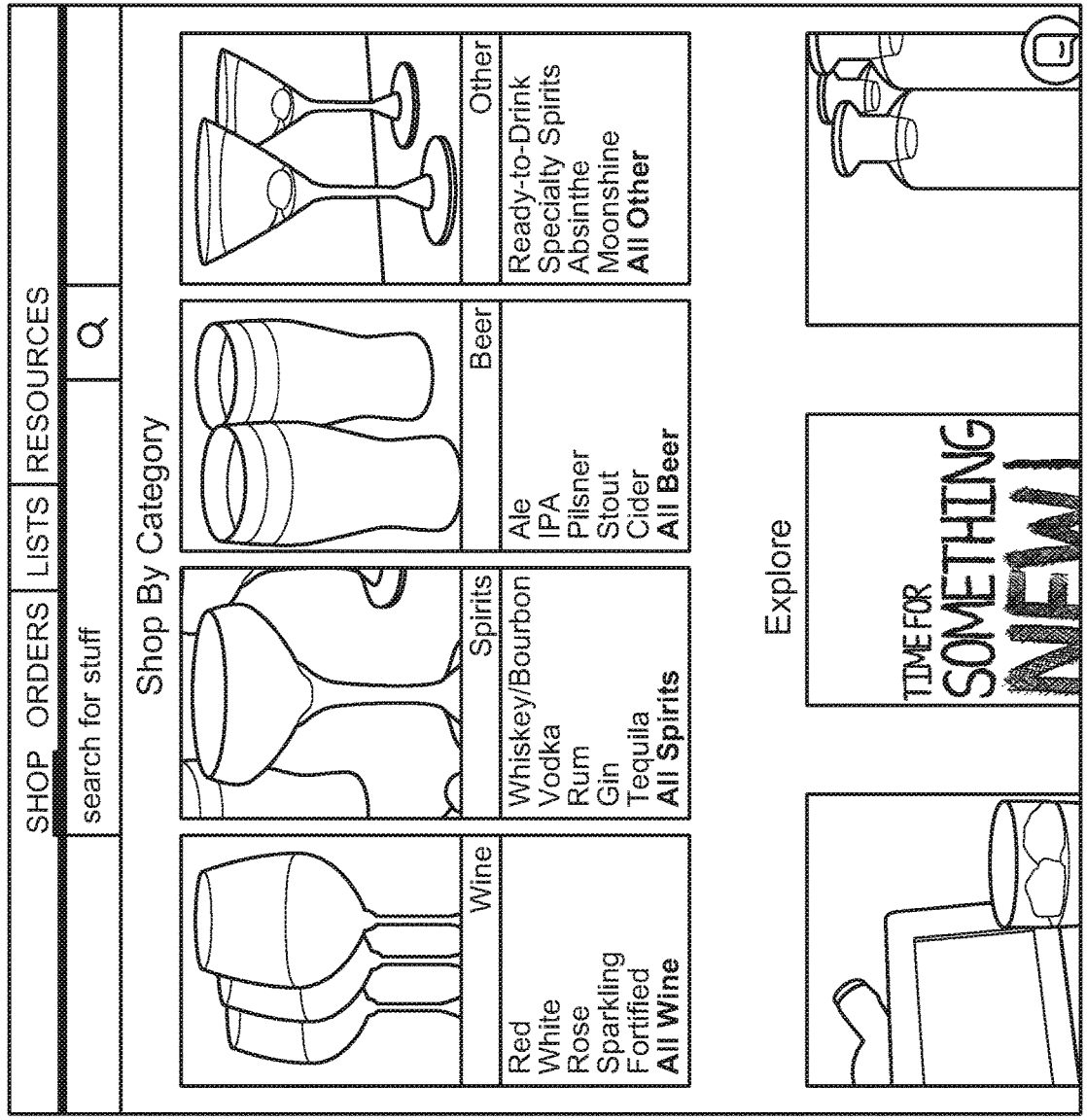
Figures 9N, 9N-1:
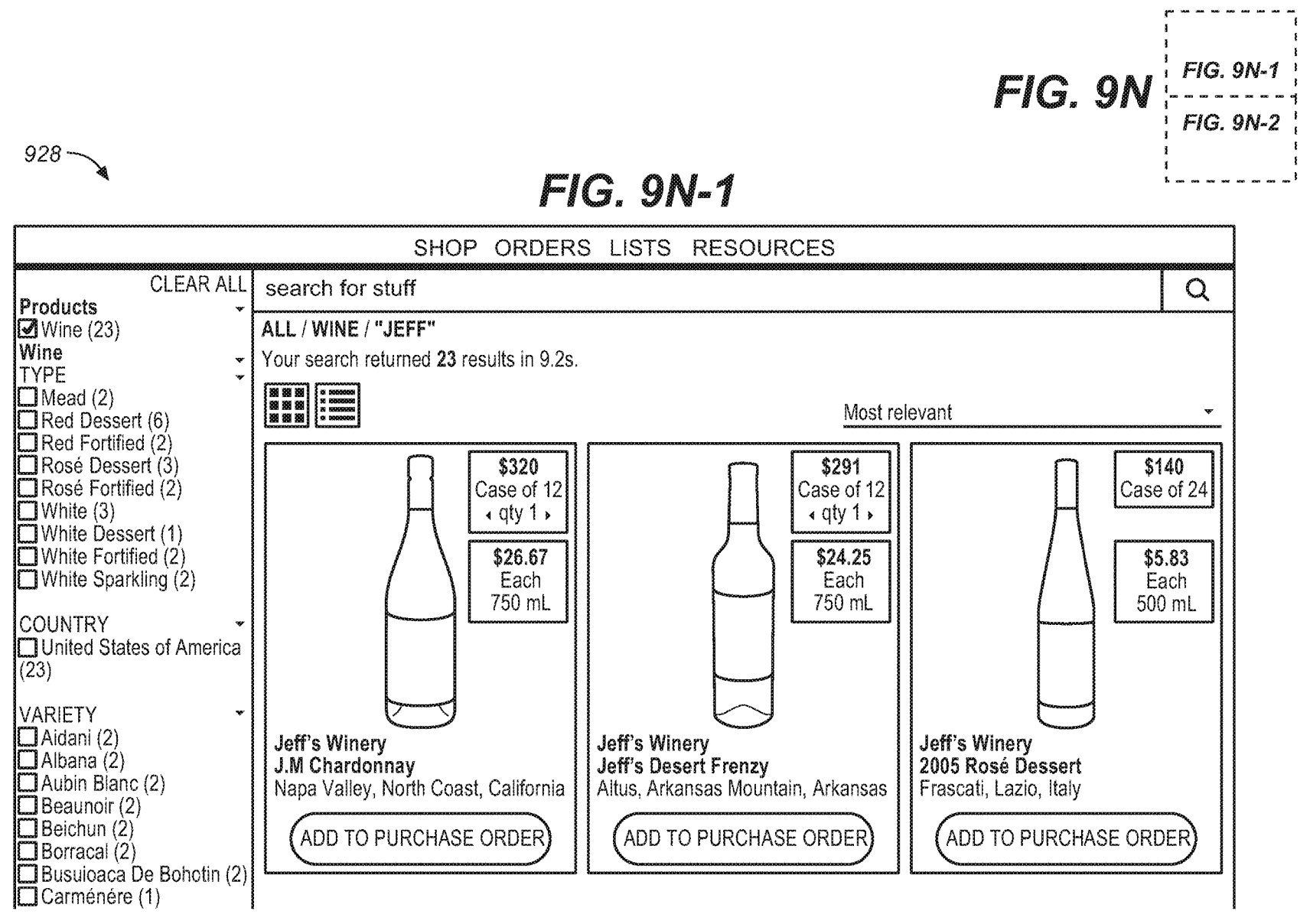
Figure 9O:
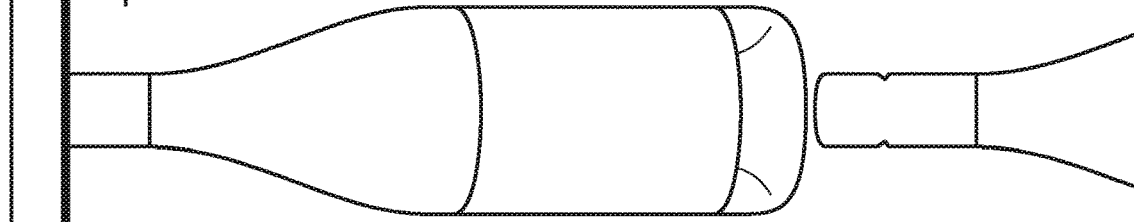
Figure 9R:
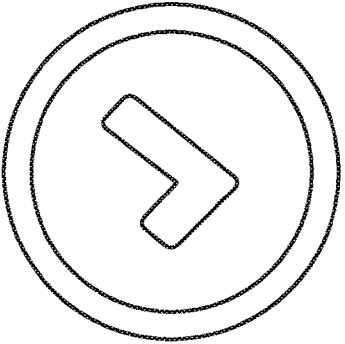

FIGS. 9A through 9R are screen shots of an example graphical user interface (GUI) of a business to business alcohol product distribution system, in accordance with various embodiments. It should be appreciated that many different views may be included within a GUI of the described distribution system, of which the illustrated views are examples.

FIG. 9A illustrates a screenshot of a participant registration view 900 of the GUI of the business to business alcohol product distribution system, in accordance with an embodiment. Participant registration view 900 includes input fields for receiving a potential participant's email address, name, and password, as well as a dropdown menu 902 for receiving a business type selection. The business type selection is used by the distribution system to determine whether the potential participant is a supplier or reseller.

FIG. 9B illustrates a screenshot of a participant contact information view 904 of the GUI of distribution system, in accordance with an embodiment. Participant contact information view 904 includes input fields for receiving a potential participant's contact information. The contact information may be used by the distribution system to determine a sales market of the participant (e.g., where the participant is a reseller).

FIG. 9C illustrates a screenshot of a license information submission view 906 of the GUI of distribution system, in accordance with an embodiment. License information submission view 906 includes input fields for receiving license information (e.g., a license number) for both federal and state regulating authorities. For each submitted license, a status bar is shown indicating the status of the license verification: entered by the participant, verification pending, and ready to participate.

FIG. 9D illustrates a screenshot of a beer product information view 908 of the GUI of distribution system, in accordance with an embodiment. Beer product information view 908 includes input fields for receiving beer type (e.g., lager, India pale ale, stout, etc.), country of origin, associated label/brewery, alcohol content, etc. It should be appreciated that many different types of beer product information may be received for describing the beer product. Moreover, beer product information view 908 includes a sidebar for navigating between brands and beer products available under the brands.

FIG. 9E illustrates a screenshot of a spirit product information view 910 of the GUI of distribution system, in accordance with an embodiment. Spirit product information view 910 includes input fields for receiving spirit type (e.g., whiskey, vodka, gin, etc.), country of origin, associated label/brewery, alcohol content, etc. It should be appreciated that many different types of spirit product information may be received for describing the spirit product. Moreover, spirit product information view 910 includes a sidebar for navigating between brands and spirit products available under the brands.

FIG. 9F illustrates a screenshot of a wine product information view 912 of the GUI of distribution system, in accordance with an embodiment. Wine product information view 912 includes input fields for receiving spirit type (e.g., chardonnay, merlot, pinot noir, etc.), country of origin, associated label/brewery, alcohol content, etc. It should be appreciated that many different types of wine product information may be received for describing the wine product. Moreover, wine product information view 912 includes a sidebar for navigating between brands and wine products available under the brands.

FIG. 9G illustrates a screenshot of a beer product information detail view 914 of the GUI of distribution system, in accordance with an embodiment. Beer product information detail view 914 includes input fields for receiving beer type (e.g., lager, India pale ale, stout, etc.) as illustrated in beer product information view 908 of FIG. 9D, as well as additional fields for receiving product images, package information, product labels, etc. It should be appreciated that many different types of beer product information may be received for describing the beer product. Moreover, beer product information detail view 914 includes a sidebar for navigating between brands and beer products available under the brands. It should be appreciated that the GUI of the distribution system also includes similar product information detail views for other types of alcohol products, e.g., wine and spirits.

FIG. 9H illustrates a screenshot of a beer product information pricing view 916 of the GUI of distribution system, in accordance with an embodiment. Beer product information pricing view 916 includes input fields for receiving pricing information for each sales market for a beer product, e.g., price, shipping cost, quantity available, shipping origin, etc. Beer product information pricing view 916 also includes a sidebar for navigating between sales markets for the beer product, as pricing information may vary across different sales markets. It should be appreciated that the GUI of the distribution system also includes similar product information pricing views for other types of alcohol products, e.g., wine and spirits.

FIG. 9I illustrates a screenshot of a market information view 918 of the GUI of distribution system, in accordance with an embodiment. Market information view 918 includes input fields for receiving license information for each sales market and offering information for each sales market (e.g., which products are available in each sales market). The license information also provides a field for receiving a digital image of the license. Market information view 918 also includes a sidebar for navigating between sales markets of the supplier.

FIG. 9J illustrates a screenshot of a product preview view 920 of the GUI of distribution system, in accordance with an embodiment. Product preview view 920 illustrates to a supplier how a product is viewed by a reseller. A drop down menu allows for switching the product preview view 920 for different sales markets. Product preview view 920 includes a sidebar for navigating between different products of the supplier.

FIG. 9K illustrates a screenshot of an order view 922 of the GUI of distribution system, in accordance with an embodiment. Order view 922 illustrates to a supplier all orders for a supplier. Order view 922 includes input fields for receiving shipping information (e.g., shipping number, tracking number, ship date, estimated delivery date, actual delivery date, etc.)

FIG. 9L illustrates a screenshot of a compliance information view 924 of the GUI of distribution system, in accordance with an embodiment. Compliance information view 924 includes input fields for receiving license information (e.g., a license number or an electronic image of a license) for both federal and state regulating authorities. For each submitted license, a status bar is shown indicating the status of the license verification: entered by the participant, verification pending, and ready to participate. In the illustrated example, the federal license is pending verification and the state license is approved. Compliance information view 924 includes a sidebar for navigating between different profile information of the participant.

FIG. 9M illustrates a screenshot of a reseller virtual inventory access view 926 of the GUI of distribution system, in accordance with an embodiment. Reseller virtual inventory access view 926 includes a search field for submitting a search request and browsing interfaces sorted by product type for browsing the virtual inventory. Reseller virtual inventory access view 926 also includes curated product libraries for viewing products sorted according to different categories (e.g., hand crafted products, new products, etc.

FIG. 9N illustrates a screenshot of a search results view 928 of the GUI of distribution system, in accordance with an embodiment. Search results view 928 illustrates the search results of a search submitted by a reseller. The search results include product information for products satisfying the search request, and provide pricing information. Search results view 928 also includes a sidebar for navigating between products of the search results based on further search refinement (e.g., tags of the product information, cost ranges, regions, etc.)

FIG. 9O illustrates a screenshot of a product detail view 930 of the GUI of distribution system, in accordance with an embodiment. Product detail view 930 provides a reseller with additional product details for a selected product, as well as pricing information.

FIG. 9P illustrates a screenshot of a product detail purchase view 932 of the GUI of distribution system, in accordance with an embodiment. Product detail purchase view 932 provides a reseller with additional product details for a selected product, as well as pricing information, and shopping cart information after the product is selected for purchase.

FIG. 9Q illustrates a screenshot of an order purchase view 934 of the GUI of distribution system, in accordance with an embodiment. Order purchase view 934 illustrates the order of the reseller including selected products, total pricing information, etc., and a selector for completing purchase of the order.

FIG. 9R illustrates a screenshot of an order confirmation view 936 of the GUI of distribution system, in accordance with an embodiment. Order confirmation view 936 indicates to the reseller that the order has been confirmed. Order confirmation view 936 also includes an option for the reseller to schedule reordering of the confirmed order.

Systems and Methods of for Resolving a Query to a Database

Database systems are typically used to manage large volumes of data in a searchable manner. In many types of database systems, e.g., the business to business regulated product distribution system described above with reference to FIGS. 1 through 9R, users submit search requests (e.g., search queries) that are resolved by the database and presented as search results. The user experience is in many ways dependent on the responsiveness of the database system in how quickly the search results can be returned to the user. For example, in an e-commerce website, a response time of over 5-10 seconds may be unacceptably long for a user, resulting in that user using another e-commerce website.

Embodiments described herein provide methods for resolving a query to a database. In order to present a large or potentially large list of data to a user or automaton, the process of querying the database, curating the content, and then summarizing the content can be a computationally expensive process. If one were to do these steps sequentially the time required would likely be noticeably long for large dataset, especially if there are a large number of clients. The problem gets exacerbated if there are a large number of clients and can quickly degrade the performance of computing instances.

For example, a query received at a database is typically performed in one large query call to identify objects that will be fetched to resolve the query. Such a query call may take a seemingly long time to resolve (e.g., 5-15 seconds) for a user submitting the query. For instance, a user querying a database populated with a virtual inventory of regulated products for purposes of purchasing the regulated products, as described in accordance with FIGS. 1 through 9R, may be presented with seemingly significant delays in resolving the query after submitting the query.

Embodiments described herein provide methods for resolving a query to a database in a manner that improves the response time to the query, thereby improving the performance of the underlying computer system. In one embodiment, a query for retrieving objects from a database is received at a computer system (e.g., a server). A candidate data set of objects is determined by applying the query to the database, where the candidate data set of objects includes identifiers of objects satisfying the query. In one embodiment, the identifiers are text labels uniquely identifying the object. In some embodiments, the identifiers also include a timestamp (e.g., generated at the time of creation of the object). The candidate data set of objects is transmitted to a client computing device as the identifiers and without transmitting the objects of the candidate data set.

At the client computing device, the identifiers of the candidate data set of objects are received and compared to identifiers of objects stored in a cache of the client computing device. In one embodiment, the client computing device first determines whether any identifiers of the candidate data set match any identifiers stored in the local cache. If any identifiers match, in one embodiment, the timestamps for the matching identifiers are compared. Based on the comparing, the client computing device determines whether any identifiers of the candidate data set do not match identifiers (and/or timestamps) stored in the local cache. The client computing device requests a subset of the objects corresponding to identifiers of the candidate data set of objects from the server computing system for identifiers of the candidate data set of objects that do not match the identifiers of objects stored in the cache of the client computing device.

The client computing device returns the candidate data set of objects using the objects stored in the local cache for those objects for which the identifiers (and timestamps) match. This allows for a faster return of search results, as objects that have not changed since the most recent retrieval can be accessed locally, without having to request the objects from the server. For those objects of the subset that are requested, the objects can be requested and/or returned asynchronously. The client computing device can generate multiple different subsets including different groups from the server, where the groups can also be returned from the server asynchronously. In some embodiments, the subsets are defined by waypoint in a page of search results, where a user scrolling to or past a waypoint causes a subset of objects to be requested from the server.

In accordance with the described embodiments, querying data, summarizing data, and presenting digested data is parallelized for presentation of analytic sub-systems to process asynchronously. In one embodiment, a candidate set of data is determined by querying over a data set, where the querying is parallelized. The query divides the candidate data set into candidate chunks (e.g., 100 data objects, 250 data objects, etc.) The chunks are dispatched to independent summary and digest requests and they process and resolve independently.

The summary and digest data (also referred to herein as "objects") are cached at a client device. In one embodiment, the cache is a distributed fast cache processor. It is determined whether the candidate data has already been processed. In one embodiment, the query set is timestamped (e.g., using the Unix Epoch timestamp of when the cache entry was created). The client compare the query set ID and the timestamp to the query set ID and timestamp of objects in the candidate data set. If the Timestamp of the client matches the current time stamp of the client, then the data does not need to be processed (as the client already has the data). If the timestamp is missing in the client's processing set or the timestamp in the caching server's cache is later, then the digest or summary is returned. If the digest is completely missing, then the process/thread will create the digest or summary data, place it in the cache with the timestamp and return it.

In some embodiments, the summary data can use the cached digest data, thereby avoiding any queries of the underlying database. If none of the caches have the desired data, in accordance with some embodiments, then the underlying distributed database is queried to fetch the data. In various embodiments, these queries are constructed so as to take advantage of the parallel processing of the underlying database system.

It should be appreciated that as the query set data is being produced, the processes of summary and digest creation can be immediately dispatched and processed independently. The queries are processed using (e.g., using XHR requests) and can be transmitted and resolved as they complete. The client gets the data in response "chunks." This has an added benefit of being able to provide user feedback as the processing occurs.

XHR requests are often load balanced and dispatched by cloud hosting environments (such as AWS, Azure, Google Cloud, IBM Watson Cloud, etc.). Therefore multiple hosts, and even multiple computing farms can process queries in parallel and asynchronously. In some embodiments, a common caching subsystem is employed that can be multi-sited across multiple availability zones. Therefore, the cached results can be made available to a large number of processing threads and hosts. This allows for dynamic scaling with load demand balancing with constant linearity.

In some embodiments, changes to the underlying data do selective and efficient cache invalidation. After the caches have been built, after the query set has been determined, no further fetches of the underlying database need be done. Cache retrieval can be orders of magnitude faster than relational or object-oriented database queries.

FIG. 10A illustrates an example data flow diagram of a system 1000, in accordance with one embodiment. System 1000 includes a client device 1010 and a database 1020. In one embodiment, client device 1010 is reseller client device 230 and database 1020 is database 212 hosted by distributor computer system 210.

At block 1022, client device 1010 receives a query. In one embodiment, as shown at block 1024, the query is modified at the client device. For example, where the client device is reseller client device 230, the query is modified according to the sales market and license type of the reseller submitting the search. It should be appreciated that block 1024 is optional. At block 1026, the query is transmitted to database 1020.

At block 1028, the query is received at database 1020. At block 1030, the query is resolved, generating a candidate data set of objects. At block 1032, identifiers identifying the candidate data sets of objects is transmitted to client device 1010, without sending the underlying data objects.

At block 1034, the received identifiers of the candidate data set are compared to stored identifiers of client device 1010 (e.g., cached identifiers). At block 1036, a request for objects corresponding to identifiers of the candidate data set that are different than the identifiers stored at client device 1010 is transmitted to database 1020.

At block 1038, the request for objects corresponding to identifiers of the candidate data set that are different than the identifiers stored at client device 1010 is received at database 1020. At block 1040, the objects corresponding to identifiers of the candidate data set that are different than the identifiers stored at client device 1010 is transmitted to client device 1010. At block 1042, the objects and identifiers are stored at client device 1010.

Figure 10B:
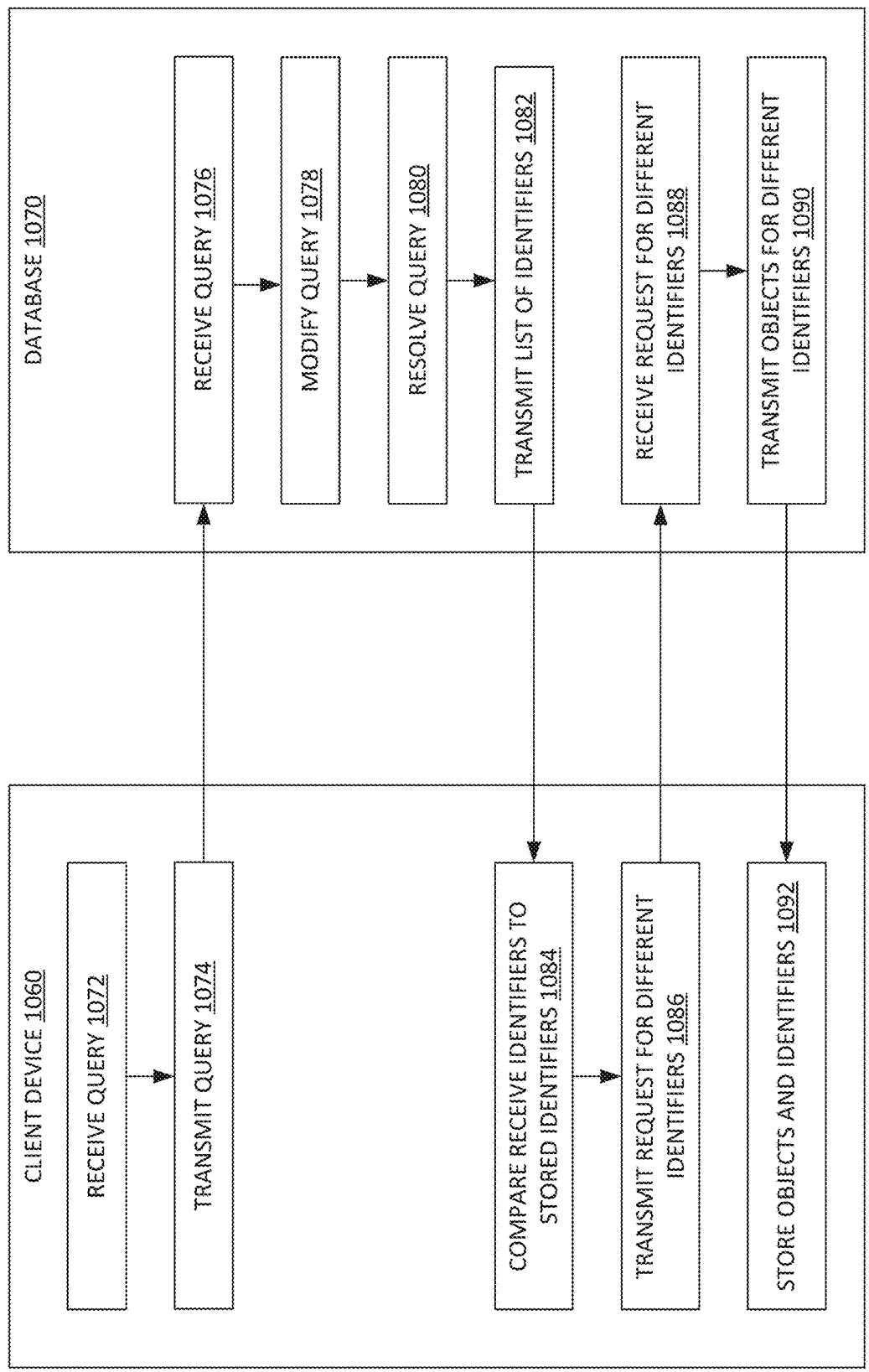

FIG. 10B illustrates an example data flow diagram of a system 1050, in accordance with another embodiment. System 1050 includes a client device 1060 and a database 1070 and operates in a similar manner as system 1000. In one embodiment, client device 1060 is reseller client device 230 and database 1070 is database 212 hosted by distributor computer system 210.

At block 1072, client device 1060 receives a query. At block 1074, the query is transmitted to database 1070. At block 1076, the query is received at database 1070. In one embodiment, as shown at block 1078, the query is modified at database 1070. For example, where the client device is reseller client device 230, the query is modified according to the sales market and license type of the reseller submitting the search. It should be appreciated that block 1078 is optional.

At block 1080, the query is resolved, generating a candidate data set of objects. At block 1082, identifiers identifying the candidate data sets of objects is transmitted to client device 1060, without sending the underlying data objects.

At block 1084, the received identifiers of the candidate data set are compared to stored identifiers of client device 1060 (e.g., cached identifiers). At block 1086, a request for objects corresponding to identifiers of the candidate data set that are different than the identifiers stored at client device 1060 is transmitted to database 1070.

At block 1088, the request for objects corresponding to identifiers of the candidate data set that are different than the identifiers stored at client device 1060 is received at database 1070. At block 1090, the objects corresponding to identifiers of the candidate data set that are different than the identifiers stored at client device 1060 is transmitted to client device 1060. At block 1092, the objects and identifiers are stored at client device 1060.

Figure 11:
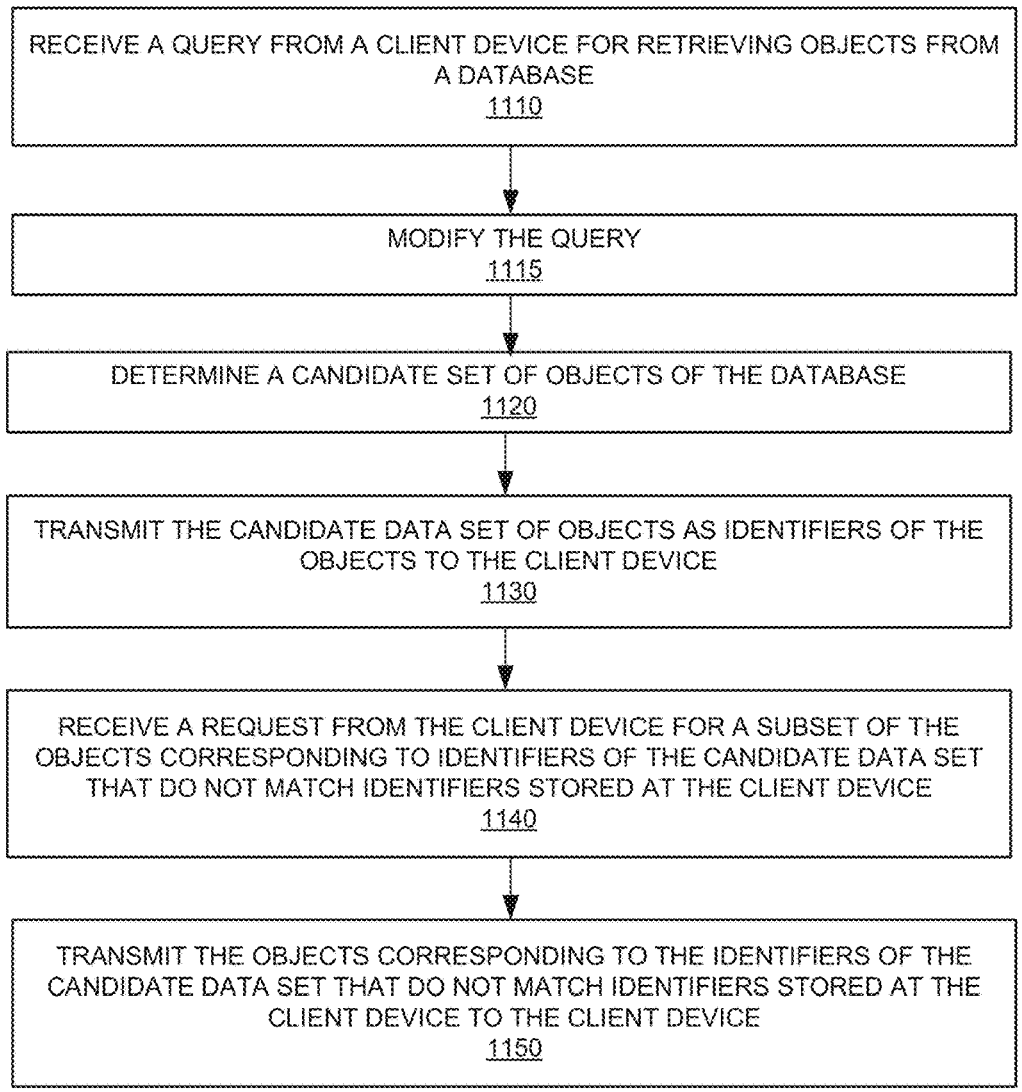
FIG. 11 illustrates a flow diagram of an example method for resolving a query at a database, according to embodiments.
Figure 12:
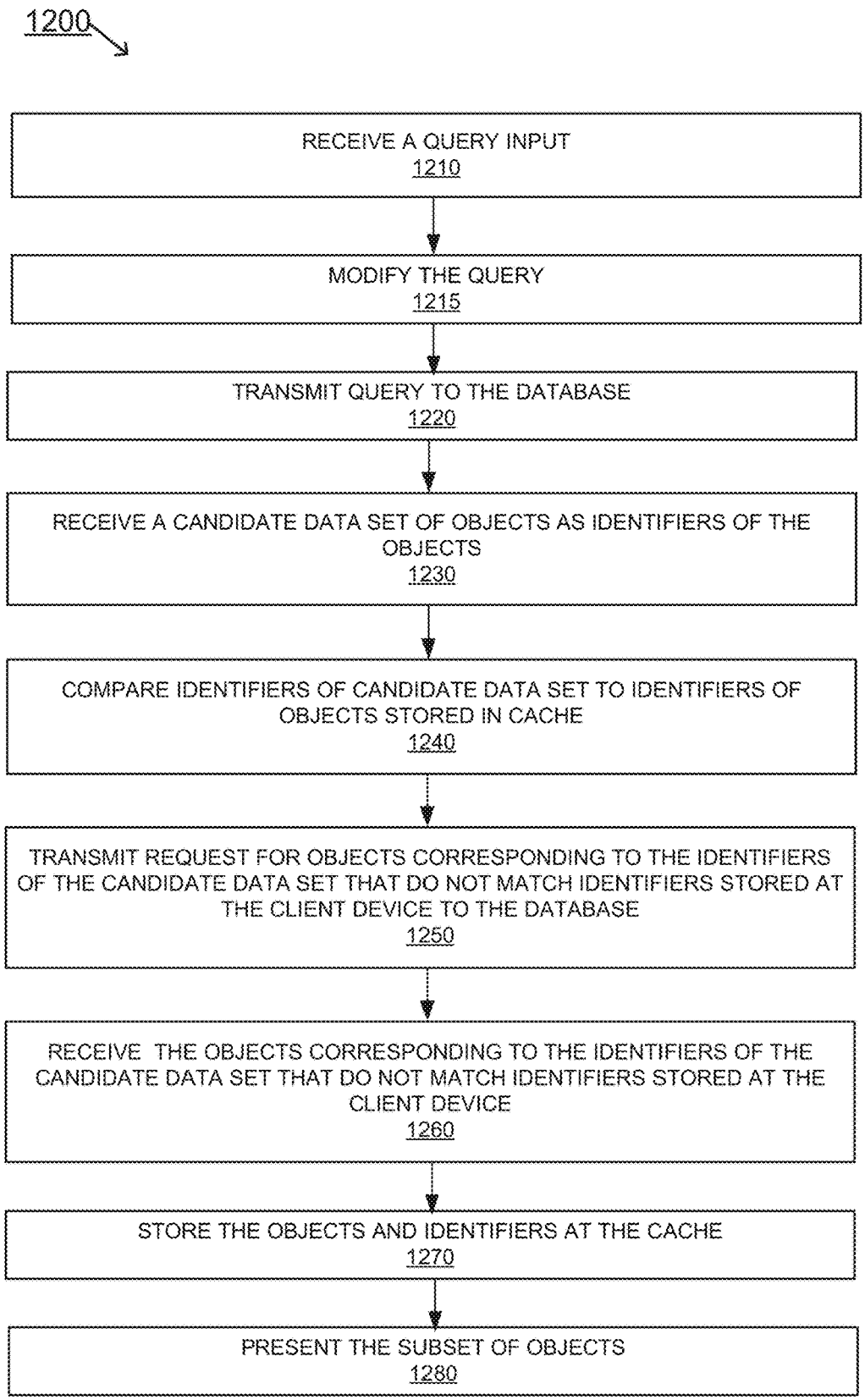
FIG. 12 illustrates a flow diagram of an example method for processing the results of a database query at a client device, according to embodiments.
Figure 13:
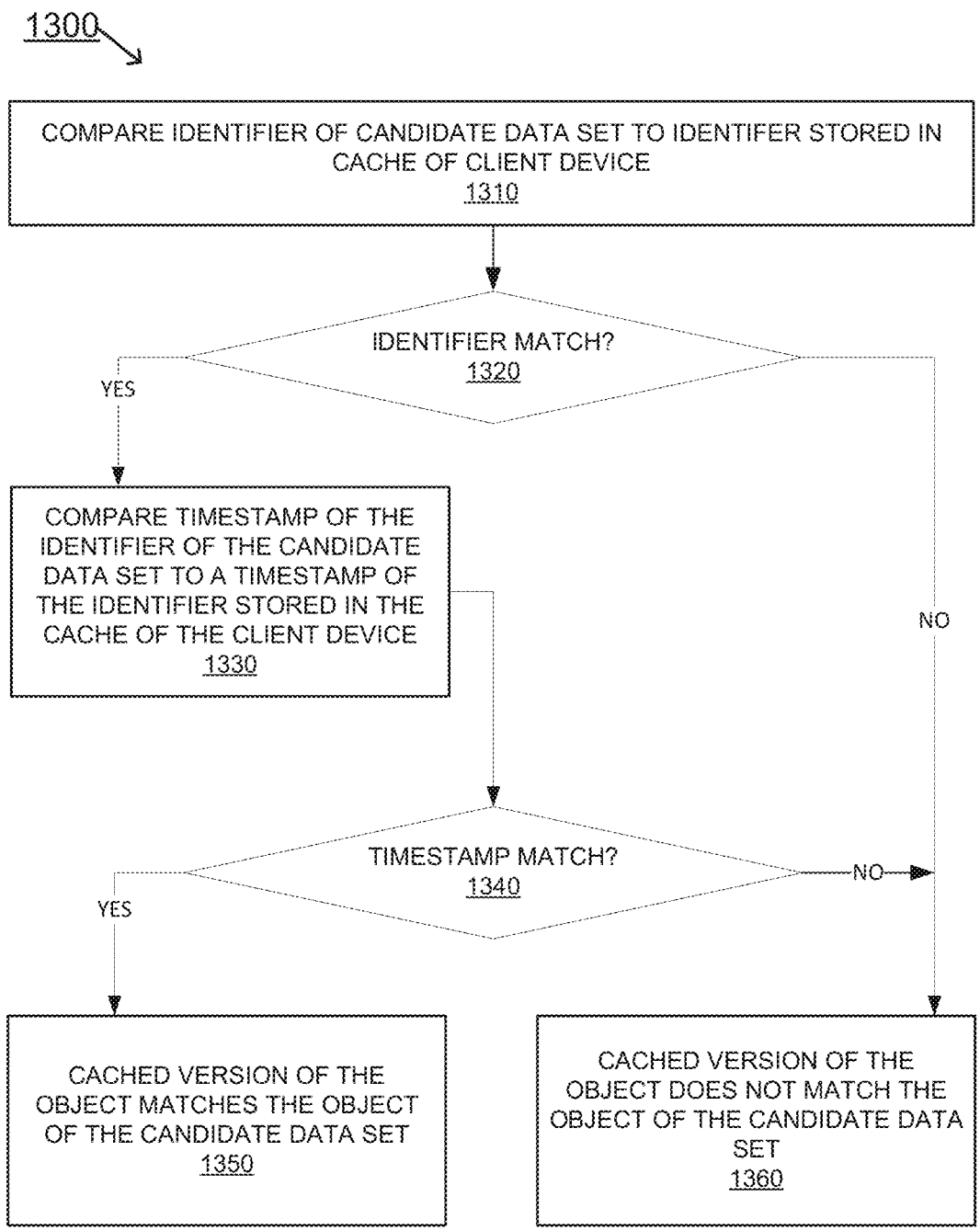
FIG. 13 illustrates a flow diagram of an example method for comparing an identifier of a candidate data set to an identifier stored at a client device, according to embodiments.

The following discussion sets forth in detail the operation of some example methods of operation of embodiments. With reference to FIGS. 11 through 13, flow diagrams 1100, 1200, and 1300 illustrate example procedures used by various embodiments. Flow diagrams 1100, 1200, and 1300 include some procedures that, in various embodiments, are carried out by a processor under the control of computer-readable and computer-executable instructions. In this fashion, procedures described herein and in conjunction with flow diagrams 1100, 1200, and 1300 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110, distributor computer system 210, supplier client device 220, and/or reseller client device 230). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 1100, 1200, and 1300 such procedures are examples. That is, embodiments are well suited to performing various other procedures or variations of the procedures recited in flow diagrams 1100, 1200, and 1300. Likewise, in some embodiments, the procedures in flow diagrams 1100, 1200, and 1300 may be performed in an order different than presented and/or not all of the procedures described in one or more of these flow diagrams may be performed. It is further appreciated that procedures described in flow diagrams 1100, 1200, and 1300 may be implemented in hardware, or a combination of hardware with firmware and/or software provided by computer system 110, distributor computer system 210, supplier client device 220, and/or reseller client device 230.

FIG. 11 illustrates a flow diagram 1100 of an example method for resolving a query at a database, according to embodiments. At procedure 1110 of flow diagram 1100, a query for retrieving objects from a database is received from a client device. In one embodiment, as shown at procedure 1115, the query is modified. At procedure 1120, a candidate data set of objects of the database is determined, wherein the candidate data set includes identifiers of the objects satisfying the query. In one embodiment, the identifier is a text label uniquely identifying the object. In some embodiments, the identifier also includes a timestamp (e.g., generated at the time of creation of the object).

At procedure 1130, the candidate data set of objects is transmitted to the client device as identifiers of the objects and without transmitting the objects to the client device. At procedure 1140, a request from the client device for a subset of the objects corresponding to identifiers of the candidate data set of objects that do not match the identifiers of objects stored in the cache of the client computing device is received at the database. At procedure 1150, the objects corresponding to the subset of objects corresponding to identifiers of the candidate data set of objects that do not match the identifiers of objects stored in the cache of the client computing device are transmitted to the client device. It should be appreciated that procedures 1140 and 1150 may be performed multiple times within flow diagram 1100, as the client device may send multiple requests corresponding to different subsets of objects corresponding to identifiers of the candidate data set of objects that do not match the identifiers of objects stored in the cache of the client computing device. Moreover, it should be appreciated that the objects transmitted at procedure 1150 may be transmitted asynchronously.

FIG. 12 illustrates a flow diagram 1200 of an example method for processing the results of a database query at a client device, according to embodiments. At procedure 1210 of flow diagram 1100, a query input is received at the client device. In one embodiment, as shown at procedure 1215, the query is modified. At procedure 1220, the query is transmitted to the database.

At procedure 1230, a candidate data set of objects that satisfy the query is received from the database as identifiers corresponding to objects of the candidate data set, wherein the candidate data set includes identifiers of the objects satisfying the query. In one embodiment, the identifier is a text label uniquely identifying the object. In some embodiments, the identifier also includes a timestamp (e.g., generated at the time of creation of the object). At procedure 1240, the identifiers of the candidate data set of objects are compared to identifiers of objects stored in a cache of the client device.

With reference to FIG. 13, a flow diagram 1300 of an example method for comparing an identifier of a candidate data set to an identifier stored at a client device is illustrated, according to embodiments. At procedure 1310 of flow diagram 1300, an identifier of the candidate data set is compared to identifiers stored in the cache of the client device. At procedure 1320, it is determined whether the identifier of the candidate data set matches any of the identifiers stored in the cache of the client device. If it is determined that the identifier of the candidate data set does not match any identifiers stored in the cache of the client device, flow diagram 1300 proceeds to procedure 1360. Alternatively, if it is determined that the identifier of the candidate data set does match an identifiers stored in the cache of the client device, flow diagram 1300 proceeds to procedure 1330.

At procedure 1330, the timestamp of the identifier of the candidate data set is compared to the timestamp of the matching identifier stored in the cache of the client device. At procedure 1340, it is determined whether the timestamp of the identifier of the candidate data set matches the timestamp of the matching identifier stored in the cache of the client device. If it is determined that the timestamp of identifier of the candidate data set does not match the timestamp of the matching identifier stored in the cache of the client device, flow diagram 1300 proceeds to procedure 1360. Alternatively, if it is determined that the timestamp of identifier of the candidate data set does match the timestamp of the matching identifier stored in the cache of the client device, flow diagram 1300 proceeds to procedure 1350.

At procedure 1350, it is determined that the object corresponding to the identifier of the candidate data set matches the object cached at the client device corresponding to the identifier of the matching identifier stored in the cache of the client device. The cached version of the object may then be used in returning the search results to the client device, such that the object corresponding to the identifier is not requested or received from the database. At procedure 1360, it is determined that the object corresponding to the identifier of the candidate data set does not match an object cached at the client device.

Returning to FIG. 12, at procedure 1250, a request for a subset of the objects corresponding to identifiers of the candidate data set of objects that do not match the identifiers of objects stored in the cache of the client computing device is transmitted to the database. At procedure 1260, the objects corresponding to the subset of objects corresponding to identifiers of the candidate data set of objects that do not match the identifiers of objects stored in the cache of the client computing device are received at the client device. It should be appreciated that procedures 1250 and 1260 may be performed multiple times within flow diagram 1200, as the client device may send multiple requests corresponding to different subsets of objects corresponding to identifiers of the candidate data set of objects that do not match the identifiers of objects stored in the cache of the client computing device. In one embodiment, as shown at procedure 1270, the objects and identifiers are stored at the cache of the client device. In one embodiment, as shown at procedure 1280, the subset of objects received is presented at a graphical user interface of the client device.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for resolving a query to a database, the method comprising:
receiving, at a server computing system, a query for retrieving objects from a database, wherein the query is received from a client computing device in response to a user input at the client computing device;
determining, by the server computing system, a candidate data set of objects by applying the query to the database, the candidate data set of objects comprising identifiers of objects satisfying the query;
transmitting, by the server computing system, the candidate data set of objects to the client computing device as the identifiers and without transmitting the objects of the candidate data set;
comparing, at the client computing system, identifiers of the candidate data set of objects to identifiers of objects stored in a cache of the client computing device; and
requesting, at the client computing system, a subset of the objects corresponding to identifiers of the candidate data set of objects from the server computing system for identifiers of the candidate data set of objects that do not match the identifiers of objects stored in the cache of the client computing device.

2. The method of claim 1, wherein an identifier comprises a timestamp.

3. The method of claim 2, wherein the comparing the identifiers of the candidate data set of objects to the identifiers of objects stored in the cache of the client computing device comprises:
for each identifier of the candidate data set of objects:
comparing the identifier of the candidate data set of objects to identifiers of objects stored in the cache of the client computing device; and
provided the identifier of the candidate data set of objects matches an identifier of an object stored in the cache of the client computing device, comparing a timestamp of the identifier of the candidate data set of objects to a timestamp of the identifier of an object stored in the cache of the client computing device.

4. The method of claim 3, wherein the requesting the subset of the objects corresponding to identifiers of the candidate data set of objects from the server computing system comprises:
provided the timestamp of the identifier of the candidate data set of objects does not match the timestamp of the identifier of the object stored in the cache of the client computing device, requesting the object corresponding to the identifier of the candidate data set of objects from the server computing system.

5. The method of claim 1, further comprising:
presenting, at the client computing system, the objects stored in the cache of the client computing device having identifiers that match the identifiers of the candidate data set of objects.

6. The method of claim 5, further comprising:
receiving, at the client computing system, the subset of the objects corresponding to identifiers of the candidate data set of objects from the server computing system; and
storing the subset of the objects in the cache of the client computing device.

7. The method of claim 6, further comprising:
presenting, at the client computing system, the subset of the objects.

8. The method of claim 1, wherein the objects represent alcohol products such that the query is for retrieving a subset of alcohol products from the database of alcohol products.

9. A non-transitory computer readable storage medium having computer readable program code stored thereon for causing a computer system to perform a method for resolving a query to a database, the method comprising:
receiving, at a server computing system, a query for retrieving objects from a database, wherein the query is received from a client computing device in response to a user input at the client computing device and comprises a user identifier;
determining a sales market and a license type based on the user identifier;
modifying, at the server computing system, the query according to the sales market and the license type to generate a reduced query;
determining, by the server computing system, a candidate data set of objects by applying the reduced query to the database, the candidate data set of objects comprising identifiers of objects satisfying the reduced query;
transmitting, by the server computing system, the candidate data set of objects to the client computing device as the identifiers and without transmitting the objects of the candidate data set;
comparing, at the client computing device, identifiers of the candidate data set of objects to identifiers of objects stored in a cache of the client computing device; and
requesting, at the client computing device, a subset of the objects corresponding to identifiers of the candidate data set of objects from the server computing system for identifiers of the candidate data set of objects that do not match the identifiers of objects stored in the cache of the client computing device.

10. The non-transitory computer-readable storage medium of claim 9, wherein an identifier comprises a timestamp.

11. The non-transitory computer-readable storage medium of claim 10, wherein the comparing the identifiers of the candidate data set of objects to identifiers of objects stored in the cache of the client computing device comprises:
for each identifier of the candidate data set of objects:
comparing the identifier of the candidate data set of objects to identifiers of objects stored in the cache of the client computing device; and
provided the identifier of the candidate data set of objects matches an identifier of an object stored in the cache of the client computing device, comparing a timestamp of the identifier of the candidate data set of objects to a timestamp of the identifier of an object stored in the cache of the client computing device.

12. The non-transitory computer-readable storage medium of claim 11, wherein the requesting the subset of the objects corresponding to identifiers of the candidate data set of objects from the server computing system comprises:
provided the timestamp of the identifier of the candidate data set of objects does not match the timestamp of the identifier of the object stored in the cache of the client computing device, requesting the object corresponding to the identifier of the candidate data set of objects from the server computing system.

13. The non-transitory computer-readable storage medium of claim 9, the method further comprising:
presenting, at the client computing system, the objects stored in the cache of the client computing device having identifiers that match the identifiers of the candidate data set of objects.

14. The non-transitory computer-readable storage medium of claim 13, the method further comprising:
receiving, at the client computing system, the subset of the objects corresponding to identifiers of the candidate data set of objects from the server computing system; and
storing the subset of the objects in the cache of the client computing device.

15. The non-transitory computer-readable storage medium of claim 14, the method further comprising:
presenting, at the client computing system, the subset of the objects.

16. A non-transitory computer readable storage medium having computer readable program code stored thereon for causing a computer system to perform a method for resolving a query to a database, the method comprising:
receiving, at a server computing system, a query for retrieving objects from a database, wherein the query is received from a client computing device in response to a user input at the client computing device;
determining, by the computing system, a candidate data set of objects by applying the query to the database, the candidate data set of objects comprising identifiers of objects satisfying the query;
transmitting, by the computing system, the candidate data set of objects to the client computing device as the identifiers and without transmitting the objects of the candidate data set; and
receiving, at the computing system, a request from the client computing device for a subset of the objects corresponding to identifiers of the candidate data set of objects from the server computing system for identifiers of the candidate data set of objects that do not match the identifiers of objects stored in a cache of the client computing device.

17. The non-transitory computer readable storage medium of claim 16, wherein an identifier comprises a timestamp.

18. The non-transitory computer readable storage medium of claim 16, the method further comprising:
transmitting, by the computing system, the subset of the objects corresponding to identifiers of the candidate data set of objects to the client computing system.

19. The non-transitory computer readable storage medium of claim 16, wherein the query comprises a user identifier.

20. The non-transitory computer readable storage medium of claim 19, the method further comprising:
determining a sales market and a license type based on the user identifier; and
modifying, at the server computing device, the query according to the sales market and the license type to generate a reduced query.

* * * * *